US007806765B2

(12) United States Patent
Okada

(10) Patent No.: US 7,806,765 B2
(45) Date of Patent: Oct. 5, 2010

(54) GAME SYSTEM INCLUDING SLOT MACHINES AND GAME CONTROL METHOD THEREOF

(75) Inventor: Kazuo Okada, Tokyo (JP)

(73) Assignee: Aruze Gaming America, Inc., Las Vegas, NV (US)

( * ) Notice: Subject to any disclaimer, the term of this patent is extended or adjusted under 35 U.S.C. 154(b) by 754 days.

(21) Appl. No.: 11/802,068

(22) Filed: May 18, 2007

(65) Prior Publication Data

US 2008/0051199 A1 Feb. 28, 2008

Related U.S. Application Data

(60) Provisional application No. 60/840,444, filed on Aug. 28, 2006.

(51) Int. Cl.
*G06F 17/00* (2006.01)

(52) U.S. Cl. ........................................................ 463/20

(58) Field of Classification Search .............. 463/16–25
See application file for complete search history.

(56) References Cited

U.S. PATENT DOCUMENTS 5,820,459 A 10/1998 Acres et al.
6,126,542 A * 10/2000 Fier ............................ 463/16
6,634,941 B2 10/2003 Olive
6,960,134 B2 * 11/2005 Hartl et al. ..................... 463/20
7,601,063 B2 * 10/2009 Okada .......................... 463/20
7,621,811 B2 * 11/2009 Okada .......................... 463/20
7,674,175 B2 * 3/2010 Yoshimura ................... 463/20
2004/0110558 A1 6/2004 Suda et al.
2008/0207309 A1 * 8/2008 Yoshizawa ................... 463/25

* cited by examiner

*Primary Examiner*—Ronald Laneau
(74) *Attorney, Agent, or Firm*—NDQ&M Watchstone LLP

(57) ABSTRACT

A game system of the present invention comprises: a second game machine for executing a second game which is different from a basic game played in a slot machine; a plurality of second game terminals, having a bet input device with which a bet on a second game player is to be inputted, and a bet controller for issuing a bet signal in accordance with the second game bet when the second game bet is inputted; a slot machine, having a game controller programmed so as to execute the basic game and also programmed so as to enable play of the second game executed on the second game machine when a prescribed second game start condition is established in the basic game, and a command input device to which a command is to be inputted concerning acceptance or refusal of the second game bet on the second game player from a player other than the second game player, the game controller issuing a command signal in accordance with the command when the command is inputted; and a central controller for determining a payout value to each of the second game terminals based upon the bet signal, the command signal and a result of the second game.

16 Claims, 29 Drawing Sheets

Fig. 11

Random number table for basic game
(Random number range: 0 to 65535)

| Combination | Random number range | Determined odds |
|---|---|---|
| BONUS | 0～999 | 1000/65536 |
| A | 1000～1999 | 1000/65536 |
| K | 2000～3499 | 1500/65536 |
| Q | 3500～4999 | 1500/65536 |
| J | 5000～6999 | 2000/65536 |
| 10 | 7000～9999 | 3000/65536 |
| Others | 10000～65535 | 55536/65536 |

Fig. 12

Payout table for basic game

| Combination | Payout number | | |
|---|---|---|---|
| | Number of credits 1 | Number of credits 2 | Number of credits 3 |
| BONUS | 100 coins | 200 coins | 300 coins |
| A | 20 coins | 40 coins | 60 coins |
| K | 10 coins | 20 coins | 30 coins |
| Q | 5 coins | 10 coins | 15 coins |
| J | 2 coins | 4 coins | 6 coins |
| 10 | 1 coin | 2 coins | 3 coins |

Fig. 13

Payout table for second game

| Bet method | Odds | Slot machine | | |
|---|---|---|---|---|
| | | Number of credits 1 | Number of credits 2 | Number of credits 3 |
| Straight bet | ×36 | ○ | | |
| Split bet | ×18 | ○ | | |
| Street bet | ×12 | ○ | | |
| Corner bet | ×9 | | ○ | |
| Five bet | ×6 | | ○ | ○ |
| Line bet | | | | |
| Dozen bet | ×3 | | ○ | ○ |
| Column bet | | | | |
| Red/Black | ×2 | | | ○ |
| Even/Odd | | | | |
| Low/High | | | | |
| Multiple bet | | OK | | |

GAME SYSTEM INCLUDING SLOT MACHINES AND GAME CONTROL METHOD THEREOF

CROSS-REFERENCE TO RELATED APPLICATIONS

This application claims priority of U.S. Provisional Application No. 60/840,444 filed on Aug. 28, 2006. The contents of this application are incorporated herein by reference in their entirety.

BACKGROUND OF THE INVENTION

1. Field of the Invention

The present invention relates to a game system including a slot machine and a game control method.

2. Discussion of the Background

As conventional slot machines, there are known slot machines where a free game and a bonus game are played in addition to a basic game, which are more likely to be advantageous for a player than the basic game, as disclosed in the specification of U.S. Pat. No. 6,634,941, and the specification of US 2004-0110558-A1. The free game and the bonus game each represent one of second games. In the second game, for example, the odds for a specific combination increases in which special symbols are displayed for imparting a prize, and a payout amount increases when the specific combination for imparting a prize is established. Moreover, in other disclosed slot machines, a payout value that can be acquired by a second game player is displayed to the player prior to the second game. Further, in U.S. Pat. No. 5,820,459, a game system connected to a plurality of slot machines is disclosed.

A second game has been played in the same slot machine housing in the conventional slot machine, and a further fresh entertainment property has been desired.

The contents of U.S. Pat. Nos. 6,634,941 and 5,820,459 and US 2004-0110558-A1 are incorporated herein by reference in their entirety.

SUMMARY OF THE INVENTION

The present invention provides a game system with a configuration described in (A) below.

(A) The game system comprises a second game machine, a plurality of second game terminals, a slot machine and a central controller.

The second game machine executes a second game which is different from a basic game played in a slot machine.

The plurality of second game terminals have a bet input device with which a second game bet on a second game player is to be inputted, and a bet controller for issuing a bet signal in accordance with the second game bet when the second game bet is inputted.

The slot machine has a game controller programmed so as to execute the basic game and also programmed so as to enable play of the second game executed on the second game machine when a prescribed second game start condition is established in the basic game. The slot machine also has a command input device to which a command is to be inputted, the command concerning acceptance or refusal of the second game bet on the second game player from a player other than the second game player. The game controller issues a command signal in accordance with the command when the command is inputted.

The central controller determines a payout value to each of the second game terminals based upon the bet signal, the command signal and a result of the second game.

The present invention is capable of adopting a configuration described in (B) below in addition to the configuration described in (A) above.

(B) The central controller determines a payout value to each of the second game terminals based upon the bet signal received within a prescribed waiting period before start of the second game and a result of the second game when the command signal is not received within the waiting period. Meanwhile, the central controller determines a payout value to each of the second game terminals based upon a bet signal received within a period from the time point of start of the waiting period to the time point of receipt of the command signal and a result of the second game when the command signal is received within the waiting period.

The present invention is capable of adopting a configuration described in (C) below in addition to the configurations described in (A) and (B) above.

(C) The slot machine has a display. Further, the game controller displays a status of the second game bet made by a player other than the second game player to the display based upon a bet signal.

The present invention is capable of adopting a configuration described in (D) below in addition to the configuration described in (A) above.

(D) The game controller allows the command to be inputted by the command input device every time the bet signal is issued from each of the second game terminals. Moreover, the command input device is configured such that a command for allowing or refusing the second game bet based upon the bet signal can be inputted into the command input device. Further, the central controller determines the payout value to each of the second game terminals based upon the bet signal allowed by the command signal and a result of the second game.

said central controller determines the payout value to each of said second game terminals based upon the bet signal allowed by said command signal and a result of said second game.

BRIEF DESCRIPTION OF THE DRAWINGS

FIG. 11 is a view showing a configuration of a random number table for a basic game.

FIG. 12 is a view showing a configuration of a payout table for a basic game.

FIG. 13 is a view showing a configuration of a payout table for a second game.

DESCRIPTION OF THE EMBODIMENTS

Figure 1:
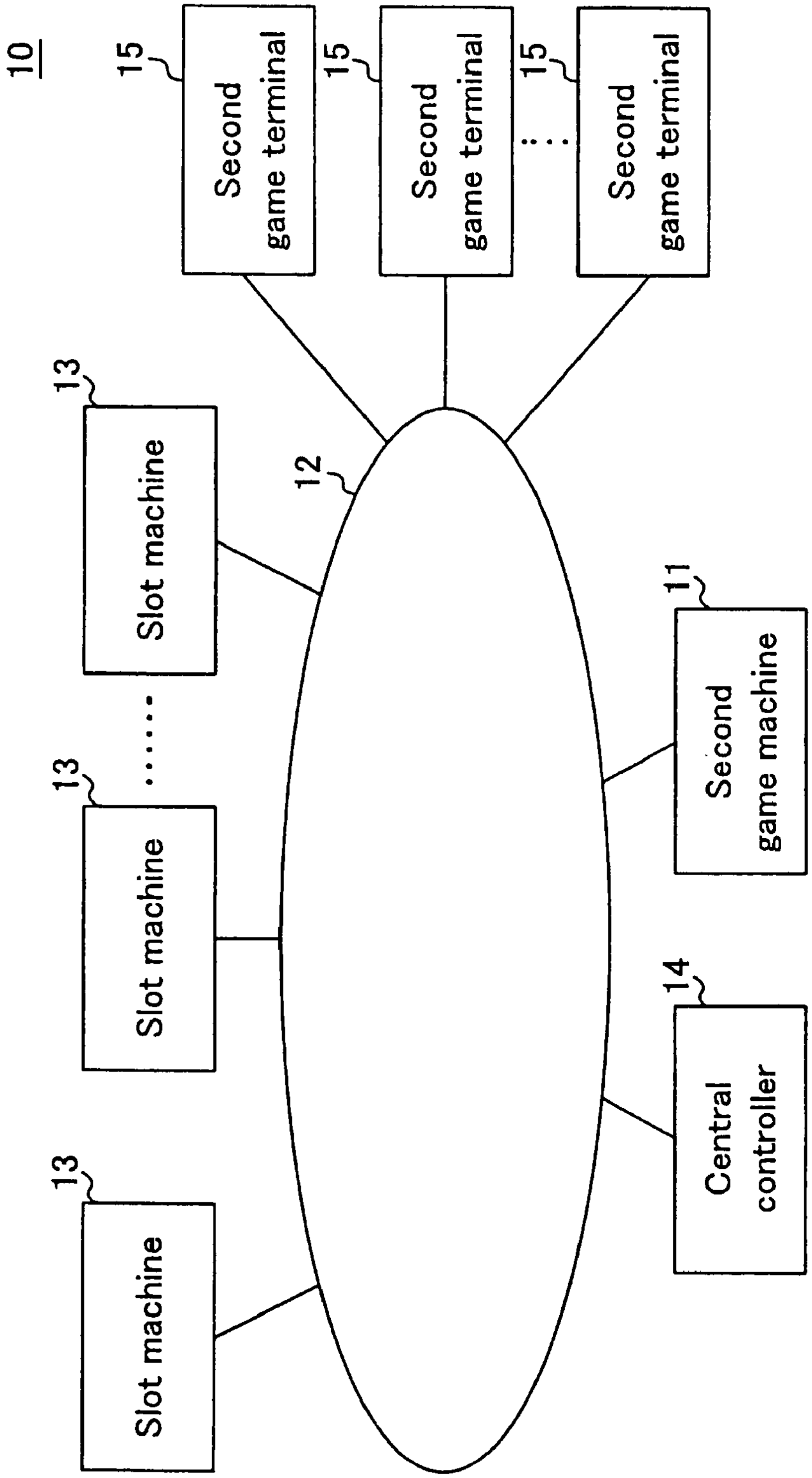
FIG. 1 is a system constitutional view of a game system according to one embodiment of the present invention.
Figure 2:
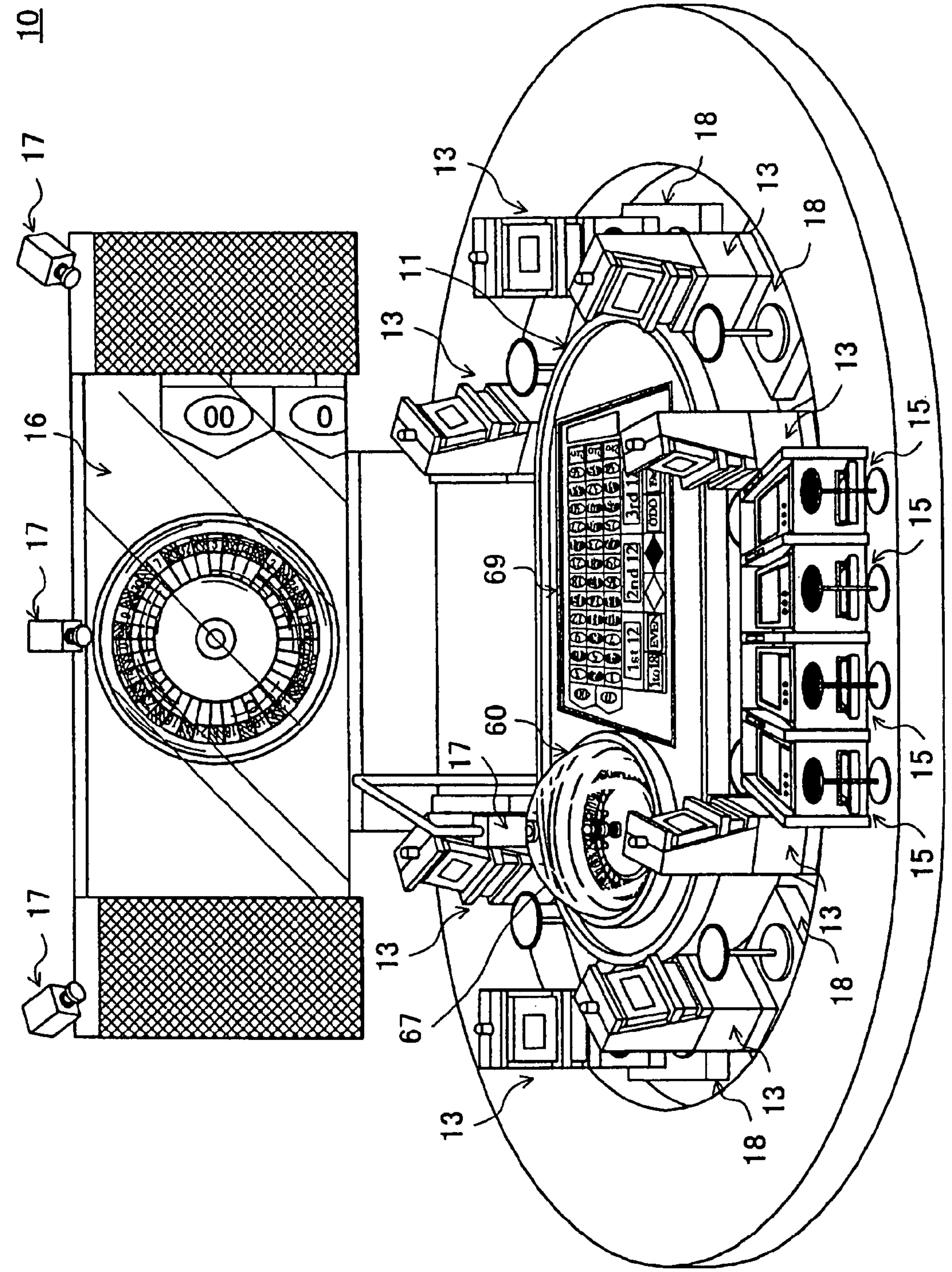
FIG. 2 is a schematic line view showing an external view of the game system according to one embodiment of the present invention.

A configuration of a game system according to the present invention is described based upon FIGS. 1 and 2.

FIG. 1 is a block diagram showing a configuration of a game system 10 according to the present invention. FIG. 2 is a perspective view showing an external configuration of the game system 10 according to the present embodiment.

As shown in FIG. 2, the game system 10 mainly comprises a slot machine 13, a second game machine 11 and second game terminals 15. The second game machine 11, for example, refers to a game machine of a roulette game. In addition to a basic game which will be described by means of after-mentioned FIG. 14, the slot machine 13 is capable of performing abet operation of a roulette game as a second game, which will be described by means of after-mentioned FIGS. 15A to 15C, when a prescribed second game start condition is established Further, the game system 10 is provided with a large-sized monitor 16, and this monitor 16 displays, as a status of a second game (hereinafter also referred to as a roulette game), contents of a betting board 71 showing a bet state of a player (see after-mentioned FIG. 7) and a display 69 that displays BET time showing the remaining time for betting, a winning number and the like, along with a projected image of a rotating roulette shot by an after-mentioned viewpoint movable camera 17, images of players or the like, according to need. The images of players include an image of a roulette game player game and an image of a game player (hereinafter referred to as an opportunistic game) to bet on the roulette game player. In order to display an image of the roulette game player, a digital camera (CCD camera) or the like may be provided on the slot machine 13. Further, in order to display an image of the opportunistic game player, a digital steel camera or the like may be provided on the second game terminal 15. The slot machine 13 and/or the second game terminal 15 may be configured to refuse display of the player image by an operation by the player. The slot machine 13 and/or the second game terminal 15 may also be configured to comprise a digital camera, animate a shot image, and display the animated image. Since a technique for animating an image shot by a digital camera is disclosed, for example, in Japanese Pat. Laid-Open No. Hei 11-197352, description of the technique is omitted here. Further, the slot machine 13 and/or the second game terminal 15 may be configured to animate a projected image shot by a digital camera in real time to display the animated image.

A plurality of slot machines 13 (eight slot machines in the present embodiment) are provided in such an orientation that the slot machines 13 enclose the second game machine 11 and the player of the slot machine 13 can view the large-sized monitor 16. Further, each of the slot machines 13 is configured such that the slot machine 13 and a chair on which the player sits are mounted on a movable floor 18, and when a second game is started, the slot machine 13 having been shifted to the second game rises integrally with the chair, with the rise of the movable floor 18.

Further, the game system 10 is provided in such a position that a plurality of second game terminals 15 (four terminals in the present embodiment), on which participation in the roulette game is possible, can view the respective monitors 16 at the front. The second game terminal 15 is a terminal exclusively for a roulette game, as well as a terminal for enabling a player other than the second game to participate in a second game when the second game is started on the slot machine 13.

Further, a plurality of viewpoint movable cameras 17 (four cameras in the present embodiment) are mounted in the game system 10. One of the viewpoint movable cameras 17 is intended for shooting of a roulette device 60 shown in after-mentioned FIG. 7, and shoots rotation of the roulette and a position of a ball 65 when the roulette is stopped, which are then displayed on the monitor 16. The viewpoint movable camera 17 for shooting an image of the roulette device 60 is mounted so as to perform shooting vertically from above the roulette device 60 in a downward direction. The viewpoint movable camera 17 for shooting the roulette device 60 may shoot images other than the roulette device 60, such as the player and a display 69 for displaying a BET screen 70 including an after-mentioned betting board 71 before rotating the roulette. The other viewpoint movable cameras 17 are mounted on the upper face of the monitor 16 for capturing an expression of the player. The projected image shot by the viewpoint movable camera 17 is displayed on a liquid crystal display 30 of the slot machine 13 and a display 93 (see FIG. 9) of the second game terminal 15, in addition to the large-sized monitor 16. The game system 10 is mounted inside amusement facilities such as a casino.

As described later, the slot machine 13 is shifted from the terminal for playing a basic game to the terminal for playing a second game when a prescribed second game start condition is established, and then a game is played. In the present embodiment, the second game start condition is stopping of a winning combination of specific symbols on a winning line.

It is to be noted that in the present embodiment, the case was described where a device capable of performing an operation of a bet on a second game player (hereinafter, also referred to as a second game bet) is the second game terminal. However, the present invention is not limited to this example, and for example, it is configured that another slot machine 13 in which the second game start condition is not established is also capable of participating in the roulette game.

Further, as shown in after-mentioned FIG. 13, a different payout table for a second game is prepared for each of the terminals so as to make payout values different between a case where a bet made on the slot machine 13 satisfying the prescribed condition won and the case where a bet on the slot machine 13 not satisfying the prescribed condition won.

Subsequently, in the game system 10, the network 12 is connected with the slot machine 13, the second game machine 11, the central controller 14 and the second game terminals 15, as shown in FIG. 1. The central controller 14 is capable of controlling the slot machine 13, the second game machine 11 and the second game terminals 15 through the network 12.

Each of the slot machines 13 is a slot machine on which a player can play a basic game. Further, the slot machine 13 performs control for shifting the basic game to a second game on a prescribed condition. The second game is a game played on the second game machine 11 under control of the central controller 14, and the slot machine 13 in use by the player functions as a terminal for a second game to allow the player to perform a bet operation in the roulette game. With such a configuration, it is possible for the player to enjoy the second game using the second game machine 11 independent of the slot machine 13.

It should be noted that in the present invention, even in the slot machine 13 not satisfying the prescribed condition, the central controller 14 may perform control to enable selection as to whether or not to participate in the second game when the second game is started on the second game machine 11 satisfying the prescribed condition. With such a configuration, it is possible for even the player of the slot machine 13 not satisfying the prescribed condition to enjoy the second game using the second game machine 11.

Further, the second game terminal 15 is connected to the central controller 14 through the network 12. The second game terminal 15 is configured such that, when a roulette game is stared on the second game machine 11, a second game can be played using the second game terminal 15 independently of the slot machine 13. It is therefore possible for a third person in amusement facilities to become a player of the roulette game using the second game terminal 15 according to the start of the roulette game. As thus described, giving an opportunity to participate in a roulette game to a player other than the second game player having not played a basic game serves as the impetus for improvement in entertainment property of the roulette game.

Figure 3:
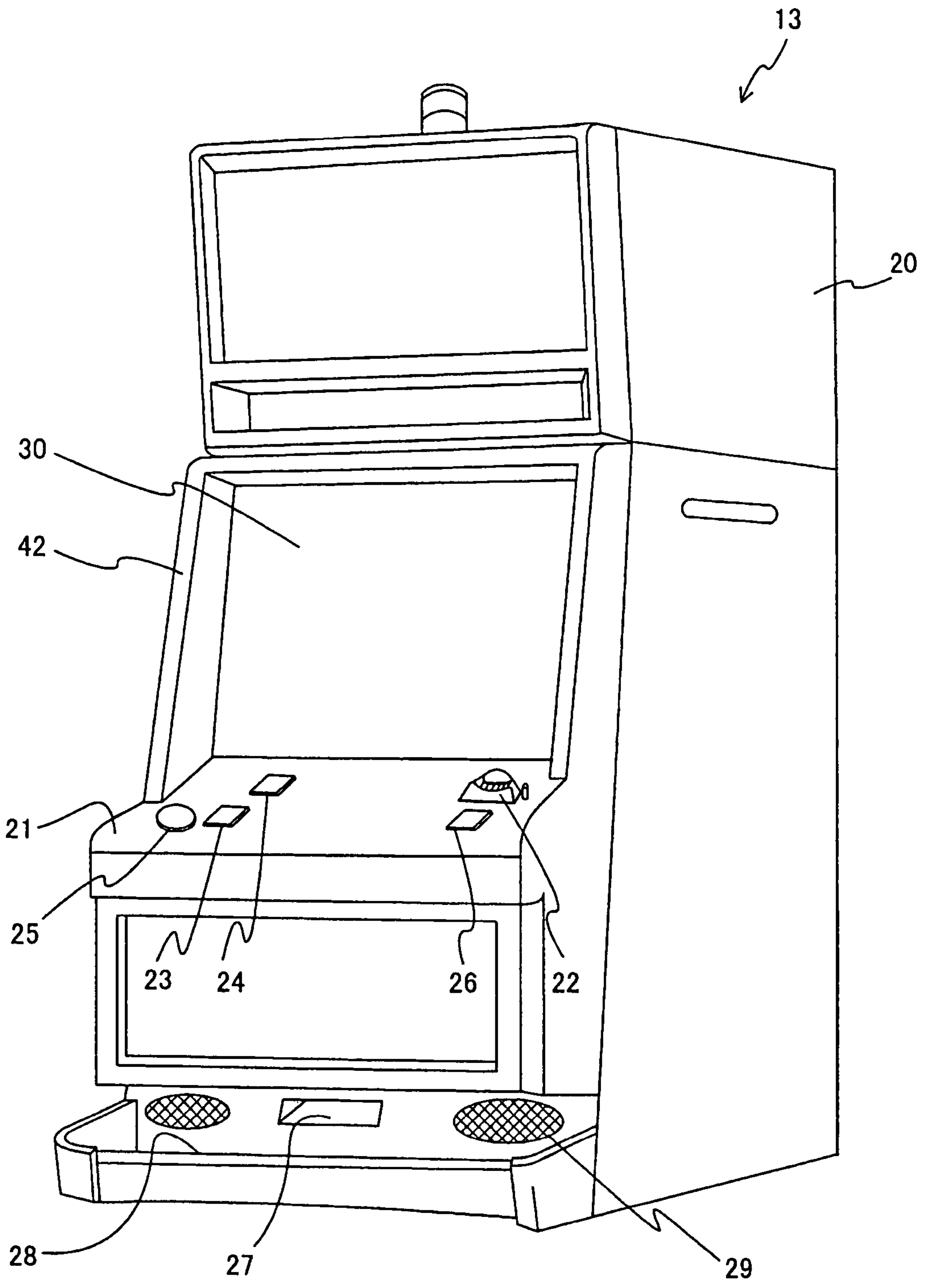
FIG. 3 is a perspective view showing a slot machine according to one embodiment of the present invention.

FIG. 3 is a perspective view showing the slot machine 13 according to the embodiment of the present invention. The slot machine 13 comprises a cabinet 20 and a main door 42. The face of the cabinet 20 facing the player opens. The inside of the cabinet 20 is provided with a variety of components including a controller 100 (see FIG. 5) for electrically controlling the present slot machine 13, and a hopper 44 (see FIG. 5) for controlling insertion, storage and payout of a coin (game medium). The game medium is not limited to the coin, and may be exemplified by a medal, a token, an electronic money and electronic valuable information (credit) corresponding thereto.

The main door 42 is a member for covering the cabinet 20 to prevent exposure of the inside thereof to the outside, and the substantial center of the main door 42 is provided with the liquid crystal display 30. The liquid crystal display 30 in the slot machine 13 corresponds to the display in the present invention. As described later, the liquid crystal display 30 is capable of displaying a symbol matrix consisting of fifteen symbols in total (five columns by three lows) and a variety of images concerning a game including an effect image. The player advances a game while visually identifying a variety of images displayed on the liquid crystal display 30.

As a plurality of kinds of symbols included in the symbol matrix, "BONUS", "WILD", "TREASURE BOX", "GOLDEN MASK", "HOLY CUP", "COMPASS&MAP", "SNAKE", "A", "K", "Q", "J" and "10" are drawn.

Below the liquid crystal display 30, a substantially horizontal operational section 21 is provided. The right side of the operational section 21 is provided with a coin inlet 22 through which a coin is inserted into the slot machine 13. On the other hand, the left side of the operational section 21 is provided with: a BET switch 23 for determining a line to be made effective out of after-mentioned nine lines L1, L2, L3, L4, L5, L6, L7, L8 and L9 for imparting a prize, to select the number of coins as game mediums to bet with respect to the line for imparting the prize (hereinafter simply referred to as "winning line") which was made effective; and a spin-repeat-bet switch 24 for playing a game again without changing the number of coins bet with respect to the winning line in the last game. The BET switch 23 or the spin-repeat-bet switch 24 are subjected to a press operation, to determine the number of betting coin to be bet with respect to the winning line according to the operation.

In the operational section 21, a start switch 25 is provided to the left side of the BET switch 23, which accepts a starting operation of a basic game performed by a player in each game. The press operation of either the start switch 25 or the spin-repeat-bet switch 24 is a trigger to start a game, and a scroll display of the symbols is started in the symbol matrix of the liquid crystal display 30.

Meanwhile, a cash-out switch 26 is provided in the vicinity of the coin inlet 22 in the operational section 21. When the player performs a press operation of the cash-out switch 26, a coin having been inserted is paid out from the coin outlet 27 which opens to the lower front face of the main door 42, and the paid-out coin is pooled in a coin tray 28. A sound-transmitting aperture 29 is provided to each of the right and left sides of the coin outlet 27 above the coin tray 28, for propagating effective sound emitted from a speaker 41 (see FIG. 5) housed inside the cabinet 20, outside the cabinet 20.

Figure 4:
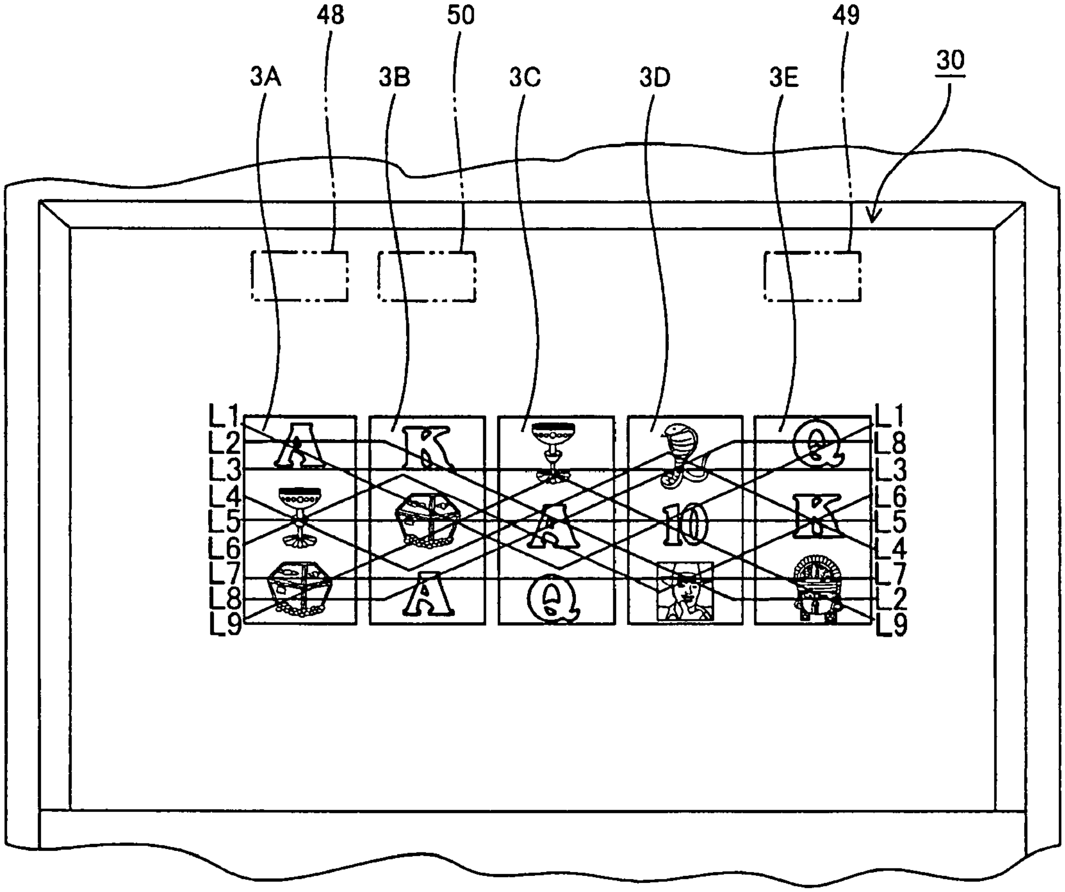
FIG. 4 is an enlarged front view showing an enlarged display region of the slot machine according to one embodiment of the present invention.

FIG. 4 shows an enlarged display region of the slot machine 13.

Five columns 3A to 3E on which symbols are scroll-displayed are displayed on the liquid crystal display 30 of the slot machine 13. Three symbols are located on each of the columns 3A to 3E. These symbols form a symbol matrix.

The left lower portion of the liquid crystal display 30 is provided with a variety of display sections: a payout number display section 48, a number-of-credits display section 49 and a bet number display section 50. The payout number display section 48 serves to display the payout number of coins when a combination for imparting a prize is established along the winning line. The number-of-credits display section 49 serves to display the number of credits of coins stored in the slot machine 13.

The slot machine 13 has the nine lines L1 to L9 for imparting a prize as shown in FIG. 4. These nine lines L1 to L9 for imparting a prize extend so as to pass through one symbol of each of the columns 3A to 3E when the symbols are relocated.

When the BET switch 23 is pressed once, for example, the line L3 for imparting a third prize, the line L5 for imparting a fifth prize and the line L7 for imparting a seventh prize are made effective, and one coin is taken in as a credit medal.

When the BET switch 23 is pressed twice, in addition to the above-mentioned three lines, for example, the line L1 for imparting a first prize, the line L4 for imparting a fourth prize and the line L8 for imparting an eighth prize are made effective, and two coins are taken in as credit medals.

When the BET switch 23 is pressed three times, in addition to the above-mentioned six lines, for example, the line L2 for imparting a second prize, the line L6 for imparting a sixth prize and the line L9 for imparting a ninth prize are made effective and three coins are taken in as credit medals.

A game executable in the present embodiment is a basic game of aligning symbols along a winning line. In this basic game, when a prescribed second game condition is established, the game is shifted to the second game using a coin in the basic game which is given upon the accomplishment of the condition.

While the case of displaying the symbol matrix to the liquid crystal display 30 was described in the present embodiment, the present invention is not limited to this example, and for example, symbols may be displayed by means of a mechanical seal to perform a basic game. Further, while the case of displaying the plurality of display sections 48 to 50 to the liquid crystal display 30 was described in the present embodiment, the present invention is not limited to this example, and the variety of display sections 48 to 50 may be displayed on a device (e.g. seven-segment display) other than the liquid crystal display 30.

Figure 5:
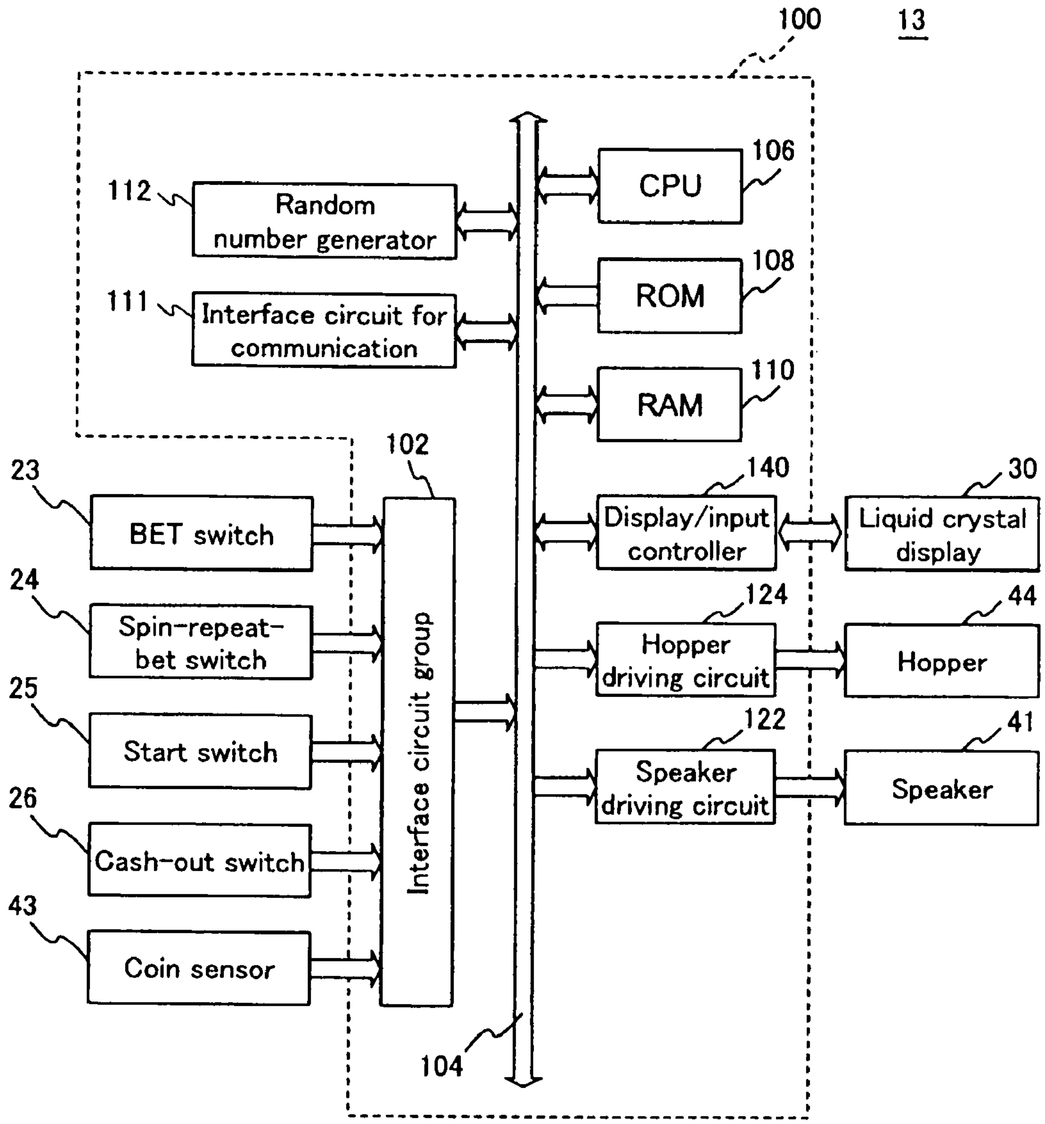
FIG. 5 is a block view showing an electrical configuration of a controller of a slot machine according to one embodiment of the present invention.

FIG. 5 is a block diagram showing an electrical configuration of the controller 100 of the slot machine 13. As shown in FIG. 5, the controller 100 of the slot machine 13 is a microcomputer, comprising an interface circuit group 102, an input/output bus 104, a CPU 106, a ROM 108, a RAM 110, an interface circuit 111 for communication, a random number generator 112, a speaker driving circuit 122, a hopper driving circuit 124, and a display/input controller 140.

The interface circuit group 102 is connected to the input/output bus 104, and this input/output bus 104 inputs/outputs a data signal or an address signal with respect to the CPU 106. The start switch 25 is connected to the interface circuit group 102. A start signal outputted from the start switch 25 is converted into a prescribed signal in the interface circuit group 102, and then supplied to the input/output bus 104.

The BET switch 23, the spin-repeat-bet switch 24 and the cash-out switch 26 are also connected to the interface circuit group 102. Each switching signal outputted form these switches 23, 24 and 26 are also supplied to the interface circuit group 102, and after being converted into a prescribed signal by the interface circuit group 102, supplied to the input/output bus 104.

A coin sensor 43 is also connected to the interface circuit group 102. The coin sensor 43 is a sensor for detecting a coin inserted into the coin inlet 22, and provided in association with the coin inlet 22. A sensing signal outputted from the coin sensor 43 is also supplied to the interface circuit group 102, and after being converted into a prescribed signal by the interface circuit group 102, the sensing signal is supplied to the input/output bus 104.

The ROM 108 and the RAM 110 are connected to the input/output bus 104.

The CPU 106 reads a basic game program to execute a basic game, triggered by acceptance of a start operation of the basic game by the start switch 25. The basic game program is made such that, on the liquid crystal display 30, the symbols are scroll-displayed and then relocated, and when a prescribed winning combination is established on the winning combination, coins in number in accordance with the winning combination are paid out.

Further, the CPU 106 also controls a second game. When a winning combination established on the winning line is a specific winning combination, the CPU 106 issues a signal for executing a second game to perform a process for allowing play of the second game.

The ROM 108 stores a control program for performing overall control of the slot machine 13, a program (hereinafter referred to as “routine executing program”) for executing a routine shown in FIGS. 14 to 15, initial data for executing the control program, and a variety of data tables for use in a determination process. It should be noted that the routine executing program includes the above-mentioned basic game program. Further, examples of the data table may include tables shown in FIGS. 11 and 12. The RAM 110 temporarily stores a flag, a variable value and the like which are used in the control program.

The interface circuit 111 for communication is also connected to the input/output bus 104. The interface circuit 111 for communication is a circuit to be communicated with the central controller 14 and the like through the network 12 including a variety of LAN networks. A second game start signal and the like are issued to the central controller 14 through the interface circuit 111 for communication. The CPU 106 receives data necessary for displaying a BET screen 70 which was received from the central controller 14 through the interface circuit 111 for communication, and displays the data as an image of the BET screen 70 to the liquid crystal display 30. Subsequently, the liquid crystal display 30 functions as a terminal on which the slot machine 13 performs a bet operation in the second game.

The random number generator 112 for generating a random number is also connected to the input/output bus 104. This random number generator 112 generates a random number included in a given range of numerical values, e.g. “0” to “65535”. Alternatively, the random number generator 112 may be configured to generate a random number by computing processing of the CPU 106.

The speaker driving circuit 122 for driving the speaker 41 is also connected to the input/output bus 104. The CPU 106 reads sound data stored in the ROM 108, and issues the read sound data to the speaker driving circuit 122 through the input/output bus 104. This leads to generation of prescribed effective sound from the speaker 41.

The hopper driving circuit 124 for driving the hopper 44 is also connected to the input/output bus 104. Upon input of a cash-out signal from the cash-out switch 26, the CPU 106 outputs a drive signal to the hopper driving circuit 124 through the input/output bus 104. Thereby, the hopper 44 pays out coins corresponding to the remaining number of credits at that time which is stored in a prescribed memory region of the RAM 110.

The display/input controller 140 is also connected to the input/output bus 104. The CPU 106 generates an image display command according to a game state and a game result, and outputs the generated image display command to the display/input controller 140 through the input/output bus 104. Upon input of the image display command from the CPU 106, the display/input controller 140 generates a drive signal for driving the liquid crystal display 30 based upon the inputted image display command, and outputs the generated drive signal to the liquid crystal display 30. This leads to display of a prescribed image to the liquid crystal display 30. The display/input controller 140 issues a signal, whose input was received by the touch panel 32 on the liquid crystal display 30, as an input signal to the CPU 106 through the input/output bus 104.

Figure 6:
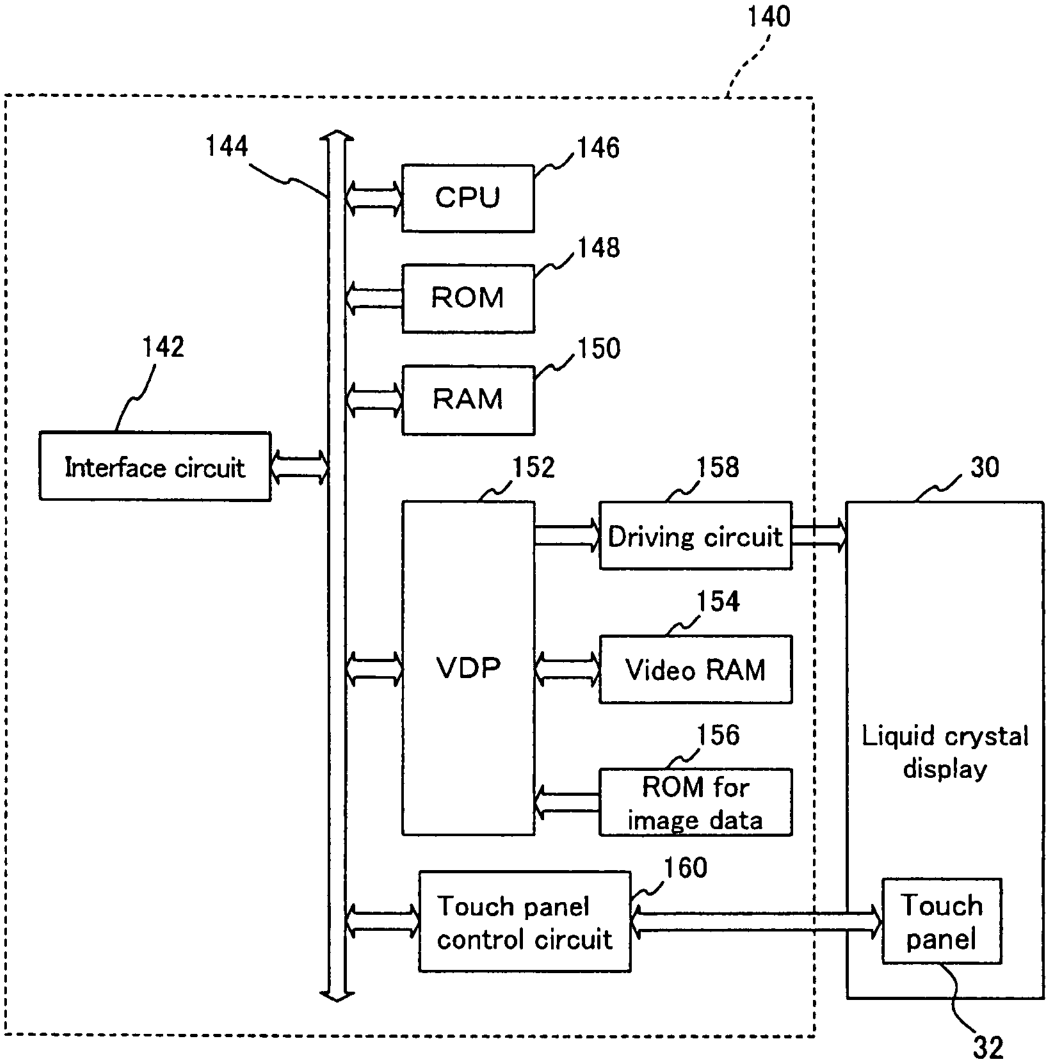
FIG. 6 is a block diagram showing an electrical configuration of a display/input controller of the slot machine according to one embodiment of the present invention.

FIG. 6 is block diagram showing an electrical configuration of the display/input controller 140 of the slot machine 13. The display/input controller 140 of the slot machine 13 is a sub-microcomputer for performing an image display process and control of input from the touch panel 32, and comprises an interface circuit 142, an input/output bus 144, a CPU 146, a ROM 148, a RAM 150, a VDP 152, a video-RAM 154, a ROM 156 for image data, a driving circuit 158, and a touch panel control circuit 160.

The interface circuit 142 is connected to the input/output bus 144. The image display command outputted from the CPU 106 on the controller 100 side is supplied to the input/output bus 144 through the interface circuit 142. The input/output bus 144 inputs/outputs a data signal or an address signal with respect to the CPU 146.

The ROM 148 and the RAM 150 are connected to the input/output bus 144. The ROM 148 stores a display control program for generating a drive signal to be supplied to the liquid crystal display 30 based upon an image display command from the CPU 106 on the controller 100 side. Meanwhile, the RAM 150 stores a flag value and a variable value for use in the above-mentioned display control program.

The VDP 152 is also connected to the input/output bus 144. This VDP 152 includes a so-called sprite circuit, a screen circuit, a pallet circuit and the like, and is capable of performing a variety of processes for displaying an image to the liquid crystal display 30. The VDP 152 is connected with the video RAM 154 for storing image data in accordance with an image display command from the CPU 106 on the controller 100 side, and the ROM 156 for image data which stores a variety of image data including effect image data and the like. Further, the driving circuit 158 which outputs a drive signal for driving the liquid crystal display 30 is also connected to the VDP 152.

The CPU 146 reads and executes a display control program stored in the ROM 148 to store image data, for display to the liquid crystal display 30 in accordance with the image display command from the CPU 106 on the controller 100 side, into the video RAM 154. This image display command includes a variety of image display commands such as a command to display the effect image. The ROM 156 for image data stores a variety of image data such as data of the effect image. The touch panel control circuit 160 issues a signal, whose input was received by the touch panel 32 on the liquid crystal display 30, as an input signal to the CPU 106 through the input/output bus 144.

The controller 100 corresponds to the game controller according to the present invention. The touch panel 32 corresponds to the command input device according to the present invention.

Figure 7:
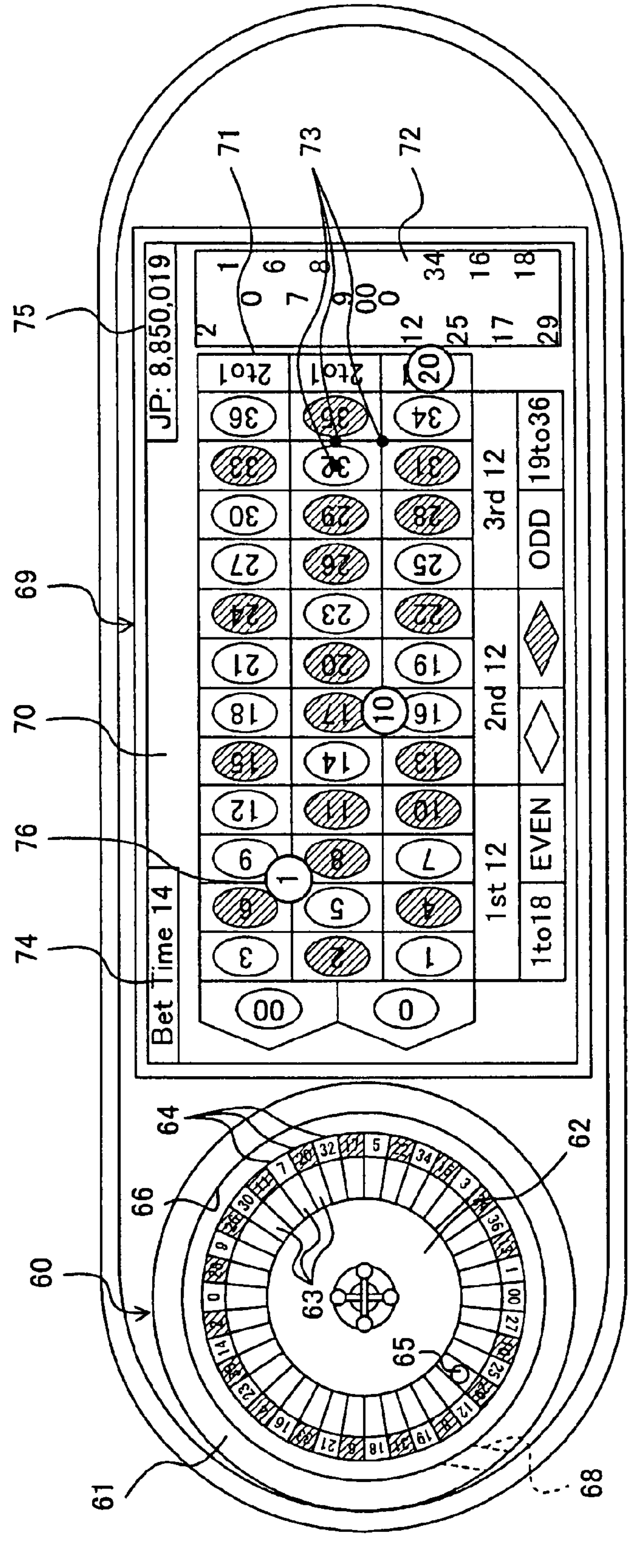
FIG. 7 is a plan view of a second game machine according to one embodiment of the present invention.

FIG. 7 shows a plan view of the second game machine 11. As shown in FIG. 2, the second game machine 11 mainly comprises the roulette device 60, the display 69 for displaying the BET screen 70 including the betting board 71 and the like.

The roulette device 60 essentially comprises a frame 61 fixed to the second game machine 11, and a wheel 62 rotatably placed and supported on the inside of the frame 61. A large number of depressed number pockets 63 (38 pockets in the present embodiment) are formed on the upper surface of the wheel 62. Further, a number display board 64, on which each of the numbers “0”, “00” and “1” to “36” as graphic characters are displayed so as to correspond to each of the number pockets 63, is formed on the upper face of the wheel 62 located outward from each of the number pockets 63. In other words, 38 number pockets 63, each imparted with any one of the numbers “0”, “00” and “1” to “36”, are formed with respect to the wheel 62.

Further, a ball insertion slot 68 is formed in the inside of the frame 61. A ball insertion device (not shown) is coupled to the ball insertion slot 68, and the ball 65 is inserted from the ball insertion slot 68 onto the wheel 62 accompanied by driving of the ball insertion device. Further, the overall upper portion of a roulette board is covered with a hemispherical covering member 67 made of transparent acrylic (see FIG. 2).

Further, a winning determination device (not shown) is mounted below the wheel 62. The winning determination device is a device for determining in which number pocket 63 the ball 65 has been held. Further, a ball collection device (not shown) is mounted below the wheel 62. This ball collection device is a device for collecting the ball 65 on the wheel 62 after the game is finished. Since the ball insertion device, the winning determination device and the ball collection device are already known, specific descriptions thereof are omitted here.

Here, the frame 61 is gently inclined inward, and a guide wall 66 is formed at the intermediate section of the frame 61. The guide wall 66 guides the inserted ball 65 to roll against the centrifugal force. When a rotational velocity of the ball 65 is getting lower and the centrifugal force is being reduced, the ball 65 rolls down inward on the inclined face of the frame 61 to reach the rotating wheel 62.

After rolling onto the wheel 62, the ball 65 passes through the surface of the number display board 64 outside the rotating wheel 62 and is then held in any of the number pockets 63. Consequently, the ball 65 is held in the number pocket 63, and a number listed on the number display board 64 which corresponds to the number pocket 63 where the ball 65 is held is determined by the determination device and becomes a winning number.

In the meantime, the display 69 for displaying the BET screen 70 having the betting board 71 is, for example, a liquid crystal display. The player bets a chip using a credit on hand by operating the slot machine 13 and the second game terminal 15 which are described later, and the betted chip is then displayed. It should be noted that a game medium such as a coin in the slot machine 13 and the second game terminal 15 is credited as a chip in a roulette game. In addition, while the BET screen 70 is displayed by means of the display 69 in the present example, the display 69 may be a screen and the BET screen 70 may be displayed using a projector or the like provided vertically downward from a ceiling. In this case, a more real display, such as a three-dimensional display of a betted chip, can be expected by the use of an existing known technique.

On the betting board 71 displayed to the BET screen 70 of the display 69, the same numbers as the 38 kinds of numbers "0", "00" and "1" to "36" are arranged and displayed. Similarly, particular BET areas 73 for specifying "odd number", "even number", "kind of color (red or black) of the number display board 64", "a given number range" (e.g. "1" to "12" or the like) are arranged in horizontal and vertical direction.

A result history display section 72 is displayed to the right of the betting board 71. The result history display section 72 displays a list of results of winning numbers in games up to last time (here, one game means a series of operations where the player on the slot machine 13 and the second game terminal 15 makes a bet, the ball 65 drops into the number pocket 63, and a credit is paid out based upon a winning number). At this time, when one game is finished, a new winning number is additionally displayed, and the history of winning numbers of up to 16 games can be visually confirmed Further, when the player bets a chip using the slot machine 13 and the second game terminal 15, the chip is bet on the BET area 73 (on a square of a number or a mark, or on a line forming squares).

A BET time display section 74 is provided above the betting board 71. The BET time display section 74 displays the remaining time in which the player can bet, in such a manner that "30" is displayed at the start of acceptance of a bet operation, the number decreases by one per a second, and the acceptance of the bet operation is finished when the number is "0". Further, when the remaining bet period for the player is "5" on the slot machine 13 and the second game terminal 15, the ball insertion device is driven to insert the ball 65 onto the roulette board.

Moreover, a JP display section 75 for displaying the number of credits of JP stored up to the moment is provided to the right side of the BET time display section 74. Here, the number at the JP display section 75 is cumulatively added with 0.5% of credits betted on all the slot machines 13 at twelve places and the second game terminal 15 participating in the game out of the second game terminals 15. When a prescribed condition is satisfied by a JP bonus game that generates on a prescribed timing, JP is won, whereby the number of credits of displayed JP is paid out, and an initial numeral value (e.g. 50000 credits) is displayed at the JP display section.

Further, the number of chips betted up to the present moment and a chip mark 76 showing the BET area 73 are displayed to the betting board 71, and a number displayed to the chip mark 76 shows the number of betted chips. For example, as shown in FIG. 7, the chip mark 76 of "1" placed at an intersection of the squares with the numbers "5", "6", "8" and "9" indicates that one chip has been betted covering the four numbers of "5", "6", "8" and "9". It is to be noted that the method for making a bet covering four numbers as described above is a bet method called a "corner bet".

Moreover, the chip mark 76 of "20" placed on the square of "2 to 1" indicates that 20 chips have been betted covering 12 numbers on the column with the numbers "1", "4", "7" . . . . It is to be noted that the method of betting on the square with "2 to 1" written down thereon covering twelve numbers is a bet method called a "column bet".

The other bet methods include: a "straight bet" of betting on only one number; a "split bet" of betting on a line between two numbers covering the two numbers; a "street bet" of betting on the end of one lateral column of numbers (one longitudinal column in FIG. 3) covering three numbers (e.g. "13", "14", "15"); a "five bet" of betting on the line between "00" and "3" covering five numbers of "0", "00", "1", "2" and "3"; a "line bet" of betting on between two lateral columns of numbers (two longitudinal columns in FIG. 3) covering six numbers (e.g. "13", "14", "15", "16", "17", "18"); and a "dozen bet" of betting on any of squares with "1st 12", "2nd 12" and "3rd 12" respectively marked thereon, each covering 12 numbers. There are further bet methods using six squares provided on the lowermost level of the betting board 71, the methods including: "red/black" of making a bet covering the color of the number display board 64 ("red" or "black"); "even/odd" of making abet covering odd/even numbers, and "low/high" of making a bet covering eighteen numbers depending upon whether the number is not more than 18 or not less than 19. Here, these pluralities of bet methods are different in payout value (payout cover) of credits per one chip when the betted chip won.

Figure 8:
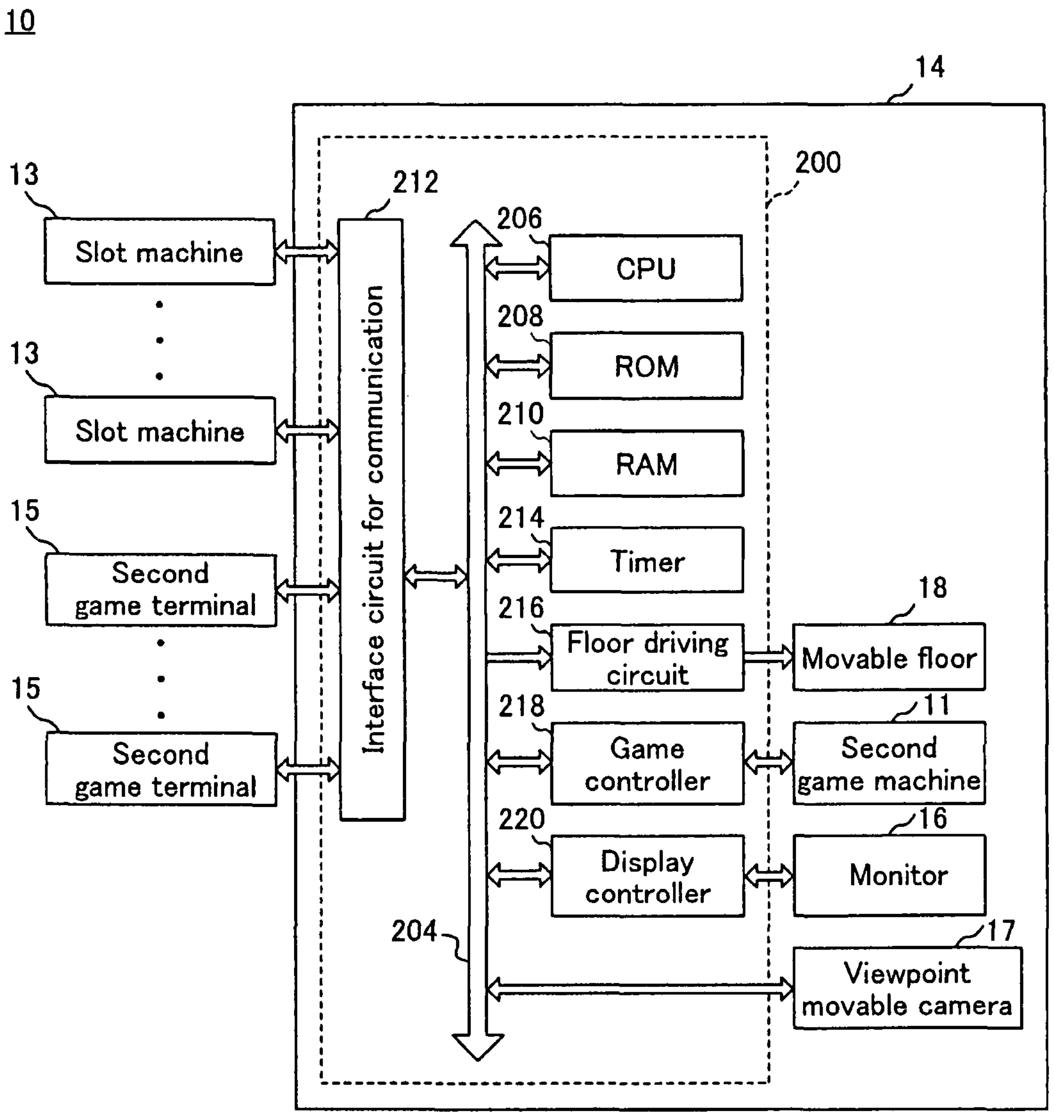
FIG. 8 is a block diagram showing an electrical configuration of a controller of a central controller according to one embodiment of the present invention.

FIG. 8 is a block diagram showing an electrical configuration of a controller 200 of the central controller 14. As shown in FIG. 8, the central controller 14 comprises the controller 200 of the central controller 14 and several peripheral devices. Further, a plurality of slot machines 13 (eight slot machines in the embodiment) and a plurality of second game terminals 15 (four second game terminals in the embodiment) are connected to the central controller 14 through an interface circuit 212 for communication.

Moreover, the controller 200 of the central controller 14 comprises an input/output bus 204, a CPU 206, a ROM 208, a RAM 210, an interface circuit 212 for communication, a timer 214, a floor driving circuit 216, a game controller 218, and a display controller 220.

The ROM 208 and the RAM 210 are connected to the input/output bus 204. The CPU 206 performs a variety of processes based upon an input signal and the like supplied from each of the slot machines 13 and the second game terminals 15 and data or programs stored in the ROM 208 and the RAM 210, and issues a command signal to each of the slot machines 13 and the second game terminals 15 based upon a process result. Thereby, the CPU 206 controls the slot machines 13 and the second game terminals 15 with initiative to advance the game. Further, the input/output bus 204 is connected to the second game machine 11 through the game controller 218. The CPU 206 drives a driving motor, which is not shown, provided in the roulette device 60 of the second game machine 11 to lead to shooting of the ball 65 and rotation of the wheel 62, as well as to control a winning determination device for specifying a drop position of the ball 65. Thereby, a winning number onto which the ball 65 has dropped is determined. Subsequently, winning determination of the betted chip is performed based upon the obtained winning number and the bet information issued from the slot machines 13 and the second game terminals 15, and the number of credits for payout is calculated on the slot machines 13 and the second game terminals 15.

The ROM 208, for example, comprises a semiconductor memory and the like, and stores a program for realizing a basic function of the second game machine 11, a program for realizing a function of the viewpoint movable camera 17, and a program for controlling the slot machines 13 and the second game terminals 15 with initiative, and the like. Examples of the program may include programs shown in FIGS. 15A to 15C. Further, the ROM 208 stores a payout cover (payout number of credits for winning per one chip) with respect to a roulette game.

Specifically, the ROM 208 is provided with a payout credit storage area (not shown) in which a payout cover concerning a roulette game using the BET screen 70 is stored, and the ROM 208 stores a payout table for a second game as shown in after-mentioned FIG. 13. It is to be noted that the payout cover with respect to each BET area 73 of the BET screen 70 stored in the payout credit storage area is previously determined to be "×2" to "×36" depending upon the type of the bet method ("straight bet", "corner bet", "split bet" or the like).

Meanwhile, the RAM 210 temporarily stores bet information of a chip supplied from the slot machine 13 and the second game terminal 15, a winning number of the roulette device 60 determined by a sensor, a JP amount accumulated up to the moment, data concerning a result of process executed by the CPU 206, and the like.

Specifically, the RAM 210 is provided with a bet information storage area in which bet information of the player now on play is stored, a winning number storage area in which a winning number of the roulette device 60 determined by the winning determination device is stored, and a JP cumulative storage area (not shown) in which the number of credits accumulatively added with 0.5% of a number of credits betted on the BET screen 70 (see FIG. 7) is stored. It is to be noted that the bet information is more specifically information concerning a bet made using the slot machines 13 and the second game terminals 15, such as the BET area 73 specified on the BET screen 70, the number of betted chips (bet number) and the type of the bet method.

The timer 214 for measuring time is connected to the input/output bus 204. The time information of the timer 214 is issued to the CPU 206 through the input/output bus 204, and the CPU 206 leads to rotational operation of the wheel 62 and insertion of the ball 65 as described later based upon the time information of the timer 214.

The floor driving circuit 216 is also connected to the input/output bus 204. The CPU 206 performs control to raise the movable floor 18 through the floor driving circuit 216 according to receipt of a signal for starting a second game from the slot machine 13. Further, the CPU 206 performs control to lower the movable floor 18 through the floor driving circuit 216 according to receipt of a signal to finish the second game from the slot machine 13.

The viewpoint movable camera 17 is also connected to the input/output bus 204. The CPU 206 performs a variety of processes based upon data and a program stored in the ROM 208 and the RAM 210, and controls the viewpoint movable camera 17 based upon the process result, to pick up an image.

Figure 9:
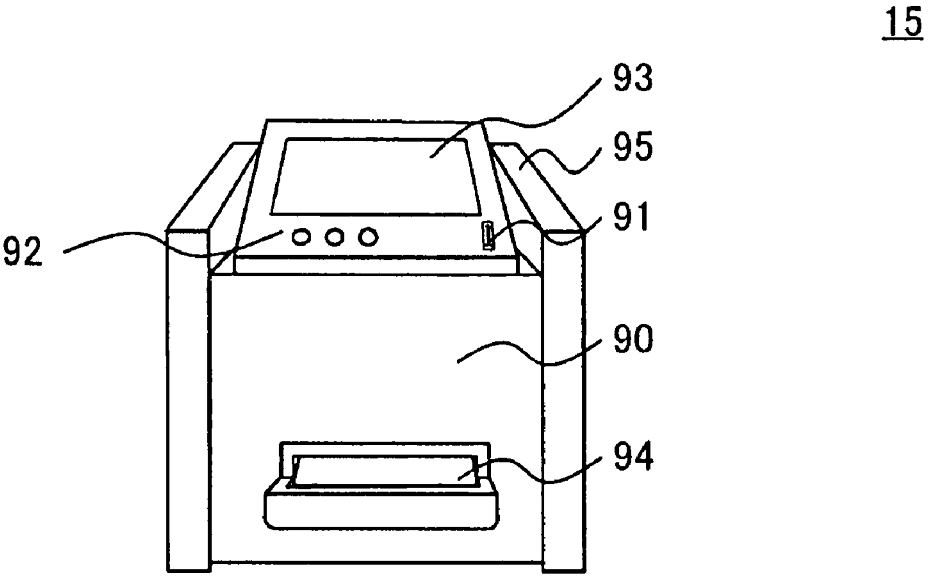
FIG. 9 is a perspective view showing second game terminals according to one embodiment of the present invention.

FIG. 9 is a perspective view showing the second game terminals 15. As shown in FIG. 9, the second game terminals 15 at least has: a coin inlet 91 into which a game media such as coin is inserted; a control section 92 made of a plurality of control buttons with which a prescribed instruction is inputted by the player and the like; and the display 93 for displaying an image according to a game, the display 93 also serving to accept a bet operation performed by the player. The player then operates a touch panel 99, the control section 92 and the like while looking at an image displayed to the display 93, to advance a game under development. The game medium for use in the second game terminal 15 is also not limited to the coin.

Further, the side face of a cabinet 90 mounted on each of the second game terminals 15 is provided with a coin tray 94. Further, a speaker 95 for delivering music, effective sound and the like is provided right above the display 93 of each of the second game terminals 15.

Moreover, a coin sensor 314 (see FIG. 10) is provided in the inside of the coin inlet 91, and the coin sensor 314 identifies a game media such as a coin inserted from the coin inlet 91 while counting the inserted coins. Further, a hopper 319 (see FIG. 10) is provided in the inside of the coin tray 94, and pays out a prescribed number of coins from the coin tray 94.

As thus described, the use of the touch panel 99 of the second game terminals 15 facilitates operationality of the player. This consequently allows a third person in amusement facilities to freely participate in a roulette game using the second game terminals 15.

Figure 10:
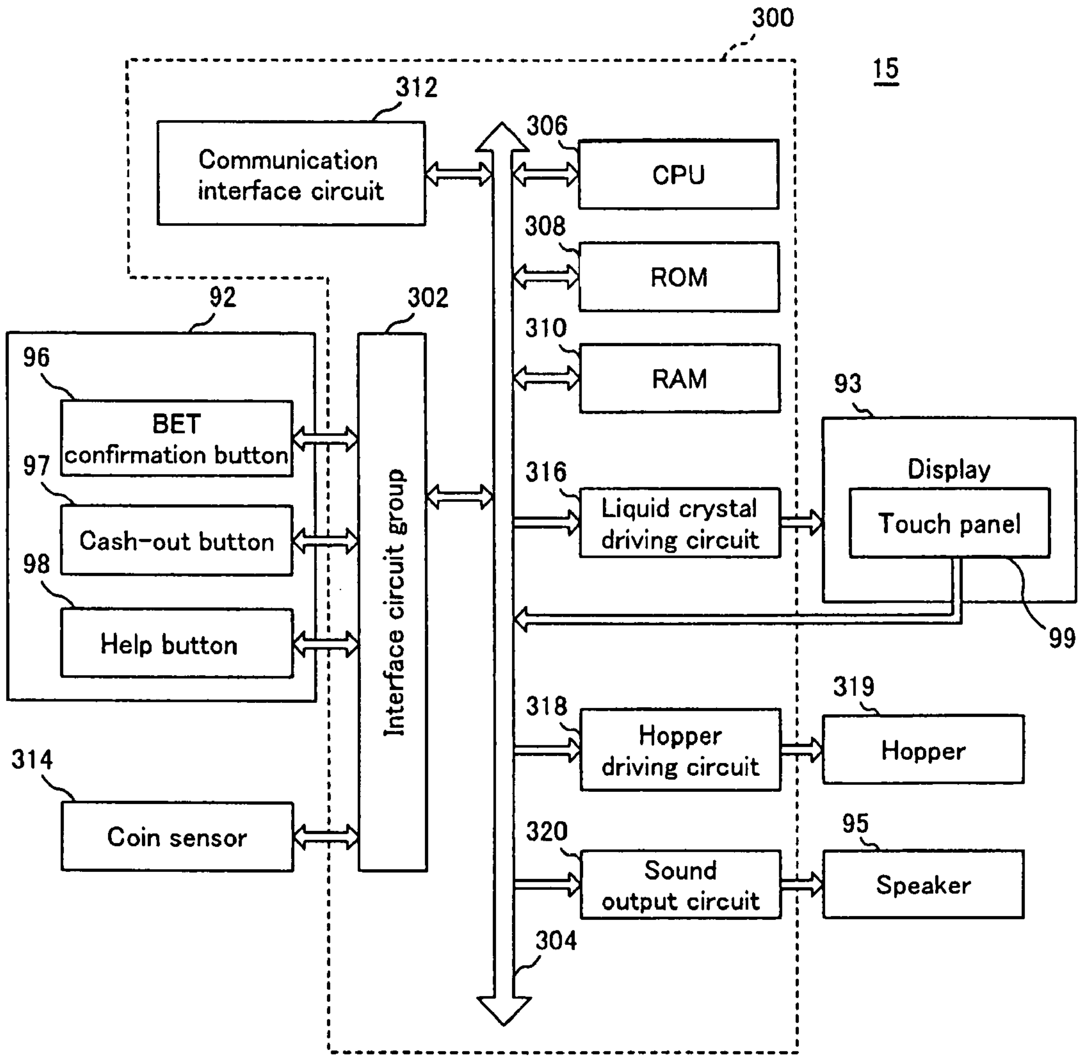
FIG. 10 is a block diagram showing an electrical configuration of a controller of the second game terminals according to one embodiment of the present invention.

FIG. 10 is a block diagram showing an electrical configuration of a controller 300 of the display 93 of the second game terminals 15. As shown in FIG. 10, the second game terminal 15 comprises the controller 300 of the second game terminal 15 and several peripheral devices.

The controller 300 comprises an interface circuit group 302, an input/output bus 304, a CPU 306, a ROM 308, a RAM 310, a liquid crystal driving circuit 316, a hopper driving circuit 318 and a sound output circuit 320. The interface circuit group 302 is connected to the input/output bus 304, and this input/output bus 304 inputs/outputs a data signal or an address signal with respect to the CPU 306.

A BET confirmation button 96 a cash-out button 97 and a help button 98, provided on the control section 92 (see FIG. 9), are separately connected to the interface circuit group 302. Respective operational signals outputted from these buttons are converted into prescribed signals in the interface circuit group 302 and then supplied to the input/output bus 304. Subsequently, the CPU 306 performs control so as to execute a variety of corresponding operations based upon the operational signals outputted by pressing of the respective buttons and supplied from the input/output bus 304.

Further, the coin sensor 314 is connected to the interface circuit group 302 connected through the input/output bus 304. The coin sensor 314 detects a coin inserted from the coin inlet 91 (FIG. 9), computes the inserted coin, and issues the computing result to the CPU 306. The CPU 306 then increases the number of credits owned by the player, stored in the RAM 310, based upon the issued signal.

The ROM 308 and the RAM 310 are connected to the input/output bus 304. The CPU 306 receives a command signal from the CPU 206 inside the controller 200 of the central controller 14 through an interface circuit 312 for communication which is connected to the input/output bus 304. The CPU 306 controls peripheral devices constituting the second game terminals 15 based upon this command signal to advance a roulette game on the second game terminal 15. Further, depending upon contents of processes, the CPU 306 executes a variety of processes based upon an input signal supplied from the control section 92 upon receipt of input of an operation by the player and data and a program stored in the ROM 308 and the RAM 310, and issues the results of the processes to the CPU 206 inside the above-controlled controller 200 of the central controller 14 through the interface circuit 312 for communication, to control the peripheral devices constituting the second game terminals 15 for advancing a roulette game on the second game terminal 15.

The ROM 308, for example, comprises a semiconductor memory and the like, and stores a program for realizing a basic function of the second game terminals 15, a variety of programs necessary in controlling the second game terminal 15, a data table and the like. Examples of the program may include programs shown in FIGS. 15A to 15C. Further, the RAM 310 is a memory which temporarily stores a variety of data computed by the CPU 306 and the number of credits currently owned by the player (stored in the second game terminal 15), the status of chip-betting by the player, and the like.

Moreover, the hopper driving circuit 318 is connected to the input/output bus 304. According to a command signal from the CPU 306, the hopper 319 connected through the hopper driving circuit 318 pays out a prescribed number of coins from the coin tray 94 (see FIG. 9)

Furthermore, the display 93 is connected to the input/output bus 304 through the liquid crystal driving circuit 316. The liquid crystal driving circuit 316 comprises a program ROM, an image ROM, an image control CPU, a work RAM, a VDP (video display processor), a video RAM and the like, though these components are not shown. The program ROM stores a program for an image control concerning display to the display 93 and a variety of selection tables. Further, for example, dot data for forming an image displayed to the display 93 is stored on the image ROM. The image control CPU determines an image to be displayed to the display 93 out of the dot data previously stored in the image ROM according to an image control program previously stored in the program ROM, based on the parameters determined on the CPU 306. The work RAM is configured as a temporary storage means when the image control program is executed by the image control CPU. The VDP forms an image in accordance with contents of a display determined by the image control CPU, and outputs the image to the display 93. It is to be noted that the video RAM is configured as a temporary storage means in the case of forming an image with the VDP.

Further, the touch panel 99 is mounted on the front face of the display 93 as described above, and operational information of the touch panel 99 is issued to the CPU 306 through the input/output bus 304. The player performs an operation of betting a chip on the BET screen 70 as shown in after-mentioned FIG. 19, displayed to the display 93, on the touch panel 99. Specifically, an operation of the touch panel 99 is performed in selection of the after-mentioned BET area 73, an operation of the unit BET button 77, and the like, and the information is issued to the CPU 306. Further, according to the information, bet information (the BET area 73 specified on the BET screen 70 and the number of betted chips) of the current player is stored into the RAM 310 as needed. Further, the bet information is issued to the CPU 206 of the central controller 14 and stored into the bet information storage area of the RAM 210.

Further, the sound output circuit 320 and the speaker 95 are connected to the input/output bus 304, and the speaker 95 generates a variety of effective sounds when a variety of effects are exerted based upon an output signal from the sound output circuit 320.

The BET confirmation button 96 and the touch panel 99 correspond to the bet input device according to the present invention. The controller 300 corresponds to the bet controller according to the present invention.

Figure 14:
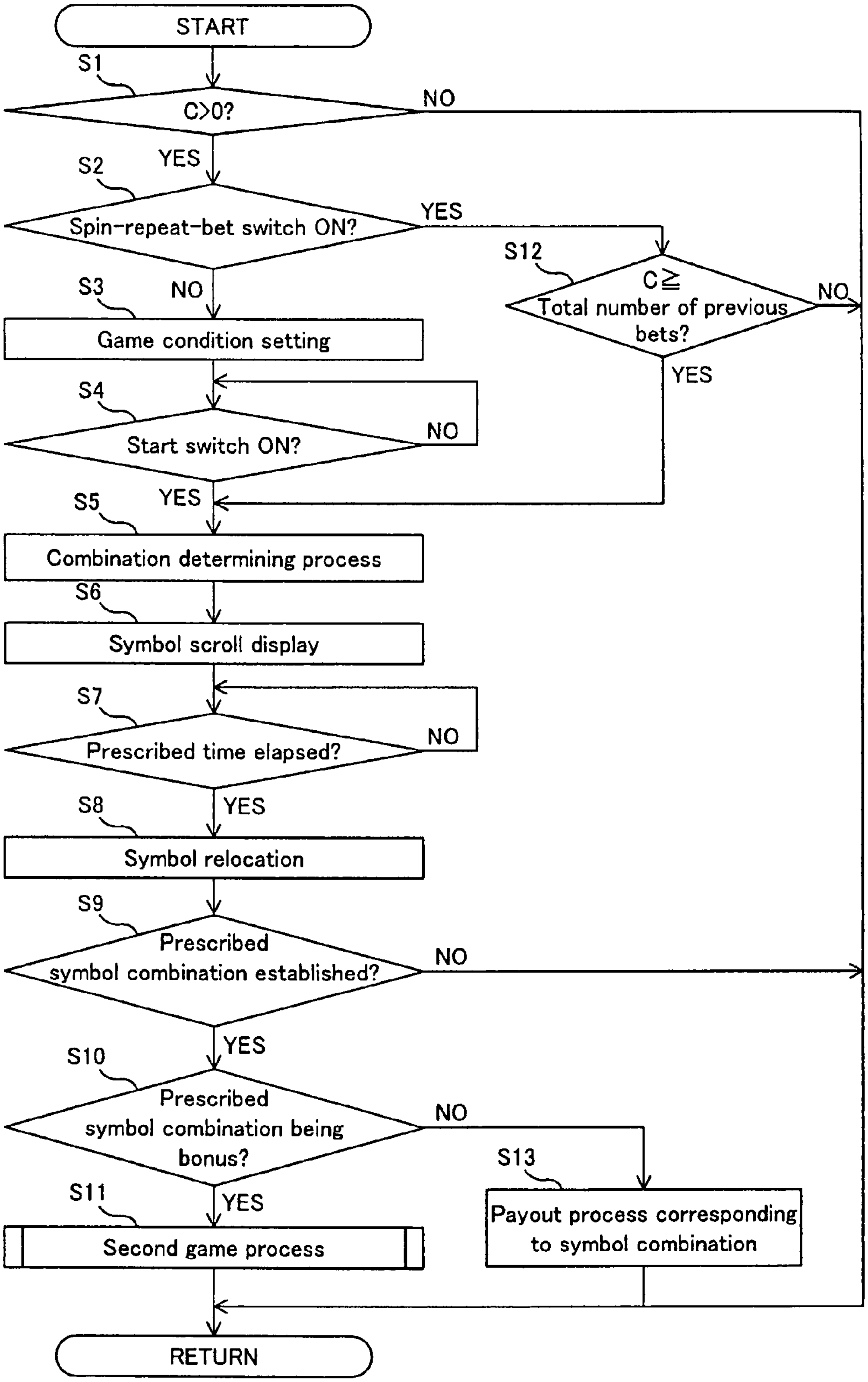
FIG. 14 is a flow chart showing a flow of process operations in a basic game on the slot machine according to one embodiment of the present invention.

FIG. 11 shows a random table for a basic game to be used in a basic game played in the slot machine 13 described in after-mentioned FIG. 14. In this random table for a basic game, a range of a random number and odds for winning are registered correspondingly to each specific combination for imparting a prize. Therefore, in an after-mentioned combination determining process (step S5 in FIG. 14), for example, when a random number within the range of "0" to "999" is extracted out of the random numbers of "0" to "65535", it is determined in the inside of the slot machine 13 to generate a specific combination for imparting a prize of "BONUS" as a result of a final basic game. In other words, the odds of determining a combination of stopped symbols as the specific combination for imparting the prize of "BONUS" are "1000/65536". Further, for example, when a random number within the range of "2000" to "3499" is extracted out of the random numbers of "0" to "65535", it is determined in the inside of the slot machine 13 to generate a specific combination for imparting a prize of "K" as a result of a final basic game. In other words, the odds of determining a combination of stopped symbols as the specific combination for imparting the prize of "K" are "1500/65536". On the other hand, when a random number within the range of "10000" to "65535" is extracted out of the random numbers of "0" to "65535", it is determined in the inside of the slot machine 13 to generate a loss as a result of a final basic game. In other words, the odds of determining a combination of stopped symbols as a loss are "55536/65536".

FIG. 12 shows a payout table for a basic game for use in a basic game described in after-mentioned FIG. 14. In this payout table for a basic game, the number of coins to be paid out is registered correspondingly to each number of credits in one game. Therefore, when it is determined whether or not a combination is a specific combination for imparting a prize, for example, in the case of generation of "K" as a combination, 10 coins are paid out when the number of BET credits is "1", 20 coins are paid out when the number of BET credits is "2", and 30 coins are paid out when the number of BET credits is "3". In addition, for example in the case of generation of "BONUS" as a combination, 100 coins are issued when the number of BET credits is "1", 200 coins are issued when the number of BET credits is "2", and 300 coins are issued when the number of BET credits is "3" to the central controller 14 as credit data, and those issued coins are usable as credits in an after-mentioned second game.

Figure 15A:
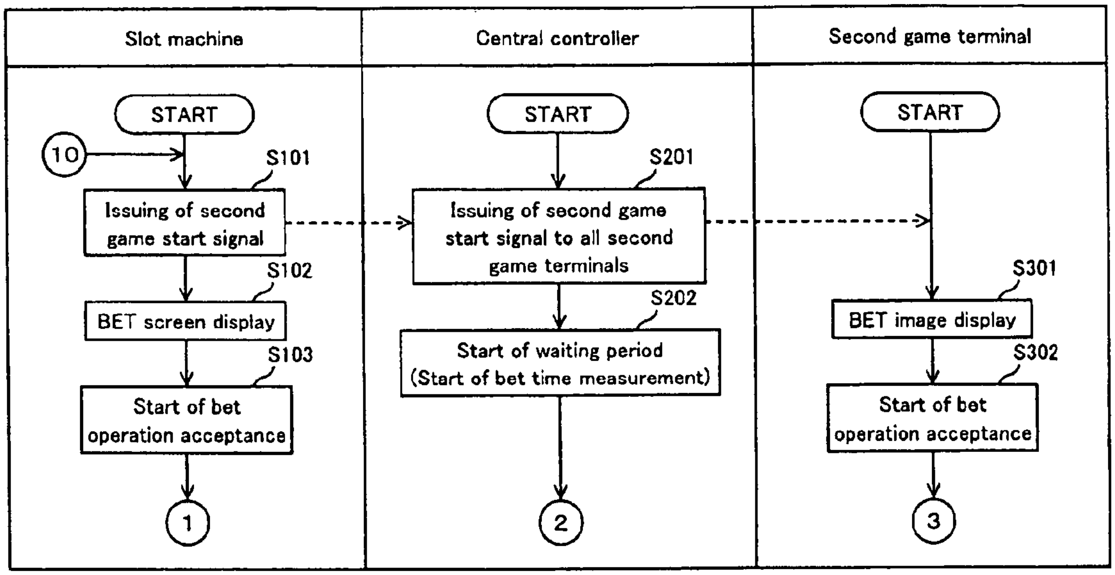
FIGS. 15A to 15C are flow charts each showing a flow of process operations in a second game played in the game system according to one embodiment of the present invention.
Figure 15B:
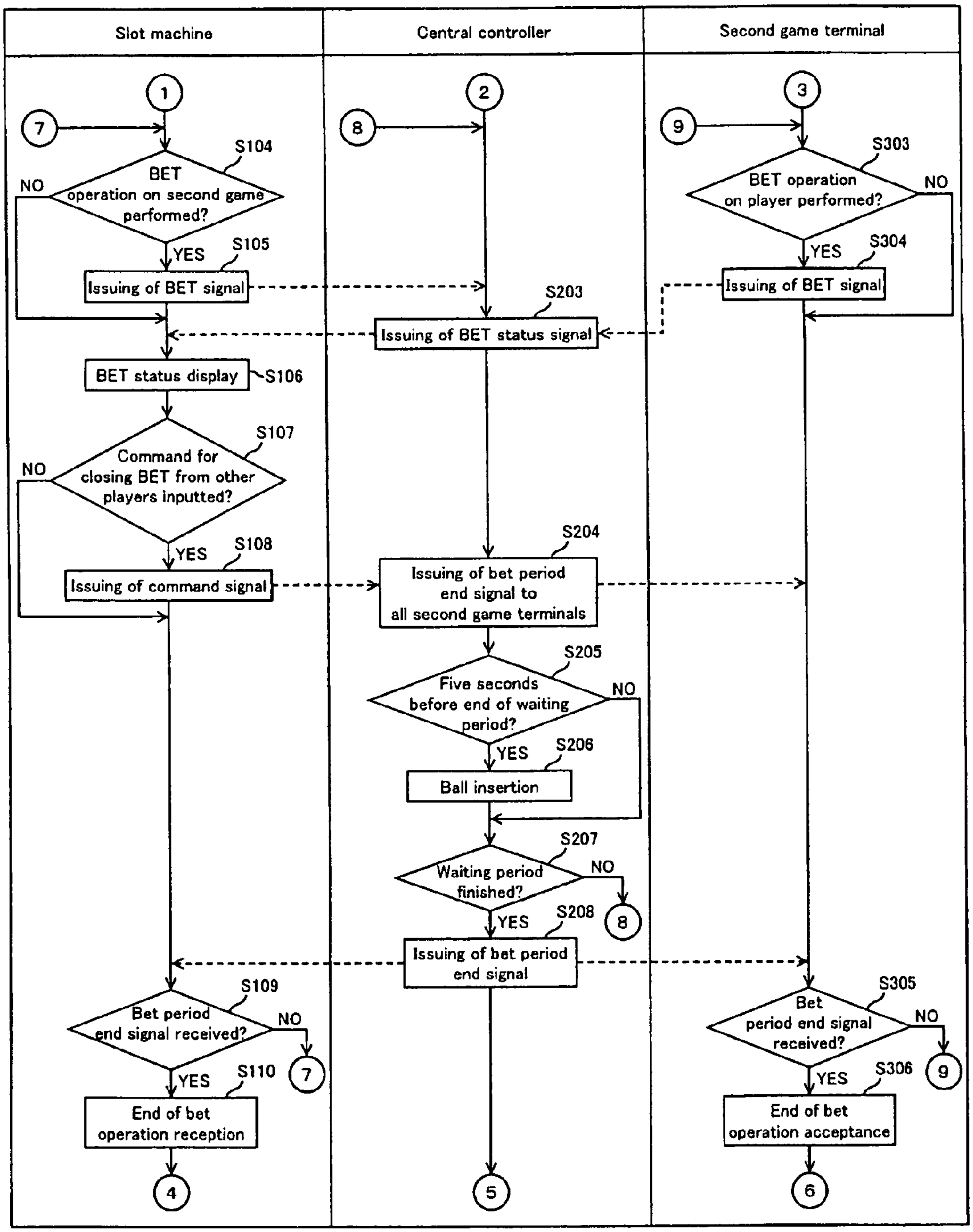
Figure 15C:
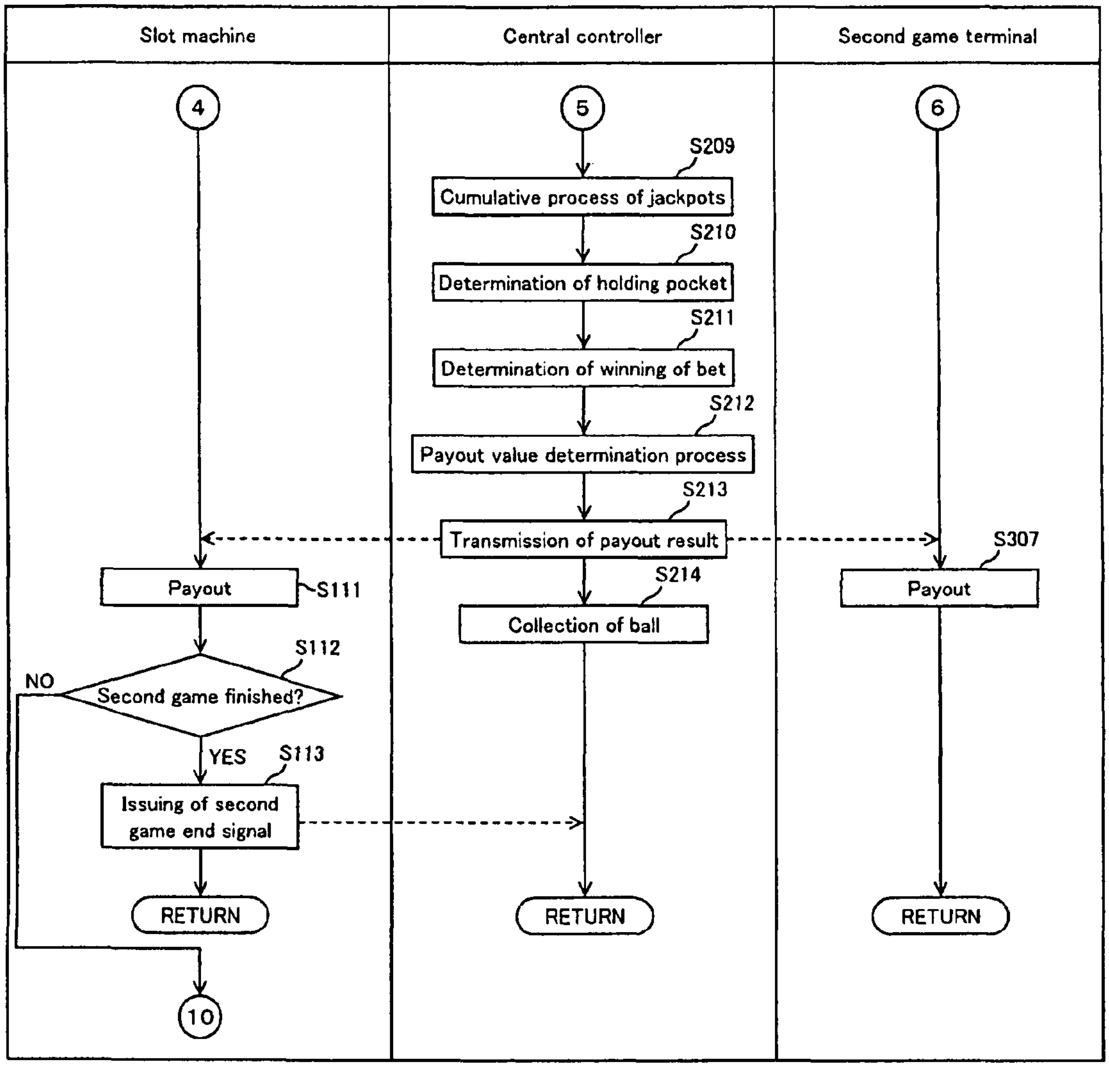

FIG. 13 shows one example of a payout table for a second game to be used in a roulette game described in after-mentioned FIGS. 15A to 15C.

In this payout table for a second game, allowable ranges of bet methods and the presence or absence of allowance for multiple betting are registered. The payout table for a second game is configured such that the allowable ranges of bet methods differ in accordance with the number of credits betted on a basic game in generation of the combination for imparting the prize of "BONUS".

For example, when the number of credits betted in generation of the combination for imparting the prize of "BONUS" is one on the slot machine 13, the bet method in which a bet can be made in a roulette game is at least one of the "straight bet", "split bet" and "street bet". On the slot machine 13, multiple betting is allowed. Therefore, the "straight bet" may be made on a plurality of places or both the "straight bet" and the "split bet" may be made.

Further, in one example shown in FIG. 13, while it is configured to limit the bet method in accordance with the number of credits betted in a basic game played in the slot machine 13, it may also be configured to set odds in accordance with the number of credits betted on the basic game played in the slot machine 13. Further, the use of a coin of the slot machine 13 as an additional credit is allowed in performing a roulette game to change the odds in accordance with the number of additional credits or to change the odds in accordance with a total amount of betted money.

FIG. 14 is a flow chart for showing a flow of process operations in a basic game played in the slot machine 13, which are executed by the controller 100 of the slot machine 13. The operations are called and executed on a prescribed timing from the main program of the slot machine 13, which was previously executed.

In the following, it is assumed that the slot machine 13 was previously activated, while a variable to be used in the CPU 106 on the controller 100 side has been initiated to a prescribed value, whereby the slot machine 13 has been in steady operation.

First, the CPU 106 on the controller 100 side determines whether or not a credit as the remaining number of coins inserted by the player is left (step S1). Specifically, the CPU 106 reads the number of credits C stored in the RAM 110 and performs a process based upon this read number of credits C. When the number of credits C is "0" (when determined NO in the process of step S1), the CPU 106 cannot start a game and thus completes the present routine without performing any process. On the other hand, when the number of credits C is not less than "1" (when determined YES in the process of step S1), the CPU 106 determines that the credit is left and shifts the process to step S2.

When the process is shifted to step S2, the CPU 106 determines whether or not an operation of pressing the spin-repeat-bet switch 24 has been performed. When the spin-repeat-bet switch 24 is pressed, followed by input of an operational signal from the spin-repeat-bet switch 24 (when determined YES in the process of step S2), the CPU 106 shifts the process to step S12. On the other hand, when the operational signal from the spin-repeat-bet switch 24 is not inputted (when determined NO in the process of step S2), the CPU 106 determines that the spin-repeat-bet switch 24 has not been pressed and then shifts the process to step S3.

When the process is shifted to step S3, a game condition is set up. Specifically, the CPU 106 determines the number of coins to be betted with respect to a winning line of the present game based upon an operation of the BET switch 23. At this time, the CPU 106 receives an operational signal issued by the operation of the BET switch 23, and based upon the number of times the operational signal is received, a BET number concerning the winning line is stored into a prescribed memory region of the RAM 110. The CPU 106 reads the number of credits C written into the prescribed memory region of the RAM 110, and subtracts a total BET number, with the above-mentioned BET number added thereto, from the read number of credits C, to store the subtracted value into the prescribed memory region of the RAM 110. The CPU 106 then shifts the process to step S4.

When the process is shifted to step S4, the CPU 106 determines whether or not the start switch 25 is ON, and when it is not ON, the CPU 106 waits for the start switch 25 to be operated. When the start switch 25 is operated and then an operational signal from the start switch 25 is inputted (when determined YES in the process of step S4), the CPU 106 determines that the start switch 25 has been operated and shifts the process to step S5.

On the other hand, when the process is shifted to step S12, the CPU 106 determines whether or not the value of the number of credits C is not less than a value of a total bet number in a previous game. In other words, the CPU 106 determines whether or not a game can be started by operation of pressing the spin-repeat-bet switch 24. Specifically, when the spin-repeat-bet switch 24 is pressed and accordingly, an operational signal is inputted from the spin-repeat-bet switch 24, the CPU 106 reads a number of credits C written into the prescribed memory region of the RAM 110 and a BET number concerning winning lines L1 to L9 in the previous game, and according to the relation between the read number of credits C and the read BET number, the CPU 106 performs a process based upon whether or not the value of the number of credits C is not less than the total bet number in the previous game. When determining that the value of the number of credits C is less than the value of the total bet number in the previous game (when determined NO in S12), the CPU 106 cannot start a game, and thus completes the present routine without performing any process. On the other hand, when determining that the value of the number of credits C is not less than the value of the total bet number in the previous game (when determined YES in S12), the CPU 106 subtracts the value of the total bet number in the previous game from the value of the number of credits C, and stores this subtracted value into the prescribed memory region of the RAM 110. Thereafter, the CPU 106 shifts the process to step S5.

When the process is shifted to step S5, the CPU 106 performs a combination determining process. Specific contents of this combination determining process are described below. In the combination determining process, first, the CPU 106 determines a combination of stopped symbols along the winning line. Specifically, the CPU 106 issues a command to the random number generator 112 for generating a random number, and extracts random numbers ("0" to "65535" in the present embodiment) in a prescribed range generated by the random number generator 112. The CPU 106 stores the extracted random numbers into the prescribed memory region of the RAM 110. It is to be noted that, while a random number is generated by the random number generator 112 provided in the outside of the CPU 106 in the present embodiment, this random number generator 112 may not be provided and a random number may be generated by computing processing of the CPU 106. The CPU 106 reads a random number table for a basic game (see FIG. 11) stored in the ROM 108 and a specific combination table (not shown) for imparting a prize, and stores the read random number table for a basic game and the read specific combination table for imparting a prize into the prescribed memory region of the RAM 110. It should be noted that the CPU 106 controls a scroll display and relocation of symbols per each column based upon the random number table for a basic game. The CPU 106 reads the random number table for a basic game and the specific combination table for imparting a prize which are stored in the prescribed memory region of the RAM 110, and refers to the random number table for a basic game with the random numbers written in the prescribed memory region of the RAM 110 as parameters, to determine a combination of stopped symbols concerning the winning line. As thus described, when the specific combination for imparting a prize is determined, the CPU 106 stores data of the determined specific combination for imparting a prize into the prescribed memory region of the RAM 110. The CPU 106 reads the random number and the specific combination for imparting a prize which were written into the prescribed memory region of the RAM 110, and based upon the read random number value and the data of the specific combination for imparting a prize, the CPU 106 determines a combination of stopped symbols which should be stopped and displayed. At this time, the symbol arrangement table (not shown) stored in the ROM 108 is read by the CPU 106 and stored into the prescribed memory region of the RAM 110 and also referred to. The CPU 106 stores data of the determined stopped symbols into the prescribed memory region of the RAM 110. It should be noted that the above-mentioned random number table for a basic game may alternately be used to determine a stopped symbol per each column.

When the combination of stopped symbols concerning the winning line is determined, the CPU 106 determines whether or not the combination of stopped symbols concerning the winning line is a specific combination for imparting a prize. When the combination of stopped symbols concerning the winning line is the specific combination for imparting a prize, in order to generate a prize corresponding to a combination of symbols as the determined specific combination for imparting a prize on the winning line, the CPU 106 enables a flag showing imparting of a prize indicative of the kind of the specific combination for imparting the prize. The CPU 106 stores the enabled flag showing imparting of the prize into the prescribed memory region of the RAM 110. On the other hand, when the combination of stopped symbols concerning the winning line is a different combination, namely a losing combination, the flag showing imparting of a prize is not enabled. Thereafter, the CPU 106 shifts the process to step S6.

In subsequent step S6, the CPU 106 starts scroll display of symbols to the columns 3A to 3E. Specifically, the CPU 106 successively or simultaneously rotates the columns 3A to 3E based upon the symbol arrangement table stored in the RAM 110.

After staring the scroll display of symbols, the CPU 106 waits for the lapse of prescribed time (step S7). At the time when the prescribed time has elapsed (when determined YES in the process of step S7), the CPU 106 performs relocation of symbols belonging to the columns 3A to 3E (step S8). Specifically, the CPU 106 successively or simultaneously stops the scroll display of each of the columns 3A to 3E such that stopped symbols corresponding to the specific combination for imparting a prize which was determined in step S5 above are displayed within a display region having a visually interactive relation with the player, to perform symbol relocation, based upon the specific combination for imparting a prize stored in the prescribed memory region of the RAM 110.

When the process is shifted to step S9, the CPU 106 determines whether or not the prescribed symbol combination is established by the combination determining process in step S5. Specifically, the CPU 106 makes the determination based upon a state of a flag showing imparting of a prize concerning the winning line which is stored in the prescribed memory region of the RAM 110. When the flag showing imparting of a prize has not been enabled, namely when the specific combination for imparting a prize belongs to "Others" (when determined NO in step S9), the CPU 106 determines that a specific combination for imparting a prize has not been established, and thus completes the present routine. On the other hand, when the flag showing imparting of a prize has been enabled, namely when the specific combination for imparting a prize belongs to other than "Others" (when determined YES in the process of step S9), the CPU 106 shifts the process to step S10.

When the process is shifted to step S10, the CPU 106 determines whether or not the specific combination for imparting a prize is "BONUS". "BONUS" is specifically alignment of the pattern of "BONUS" along the wining line as shown in after-mentioned FIG. 16. In the present example, when "BONUS" is established, a second game is started. The CPU 106 makes the determination based upon data of the specific combination for imparting a prize stored in the prescribed memory region of the RAM 110. When the data of the specific combination for imparting a prize is not "BONUS" (when determined NO in the process of step S10), the CPU 106 determines that "BONUS" has not been established as the specific combination for imparting a prize, and shifts the process to step S13. On the other hand, when the data of the specific combination for imparting a prize is "BONUS" (when determined YES in the process of step S10), the CPU 106 determines that "BONUS" has been established as the specific combination for imparting a prize, and shifts the process to step S11.

When the process is shifted to step S11, the CPU 106 performs a second game process shown in after-mentioned FIGS. 15A to 15C, to allow play of a second game executed on the second game machine 11. After performing the second game process, the CPU 106 completes the present routine.

On the other hand, when the process is shifted to step S13, the CPU 106 pays out the number of coins in accordance with the specific combination for imparting a prize. Specifically, the CPU 106 calculates the payout number of coins corresponding to the specific combination for imparting a prize. The CPU 106 reads the number of credits stored in the prescribed memory region of the RAM 110 and adds the calculated payout number to the read number of credits, to store the obtained added value into the prescribed memory region of the RAM 110. The CPU 106 displays the stored value in the number-of-credits display section 49. Thereafter, the CPU 106 completes the present routine.

Subsequently, FIGS. 15A to 15C are flow charts each showing a flow of process operations in a second game played in the game system 10. Based upon FIGS. 15A to 15C, a second game process program of the slot machine 13 executed by the CPU 106 of the slot machine 13, a second game process program of the central controller 14 executed by the CPU 206 of the central controller 14, and a second game process program of the second game terminal 15 executed by the CPU 306 of the second game terminal 15 are sequentially described. It is to be noted that each of the programs shown in the flow charts of FIGS. 15A to 15C is stored in the ROM 108 or the RAM 110 of the slot machine 13, the ROM 208 or the RAM 210 of the central controller 14, or the ROM 308 or the RAM 310 of the second game terminal 15. Each of the programs is executed by the CPU 106 of the slot machine 13, the CPU 206 of the central controller 14, or the CPU 306 of the second game terminal 15.

First, the second game process program of the slot machine 13 is described based upon FIGS. 15A to 15C. In step S101 of FIG. 15A, the CPU 106 issues a second game start signal to the central controller 14. Subsequently, the CPU 106 shifts the process to step S102.

The second game start signal at least includes data for specifying the slot machine 13, information of the number of credits betted when the combination of "BONUS" is established in a basic game, and information of the winning line.

Figure 19:
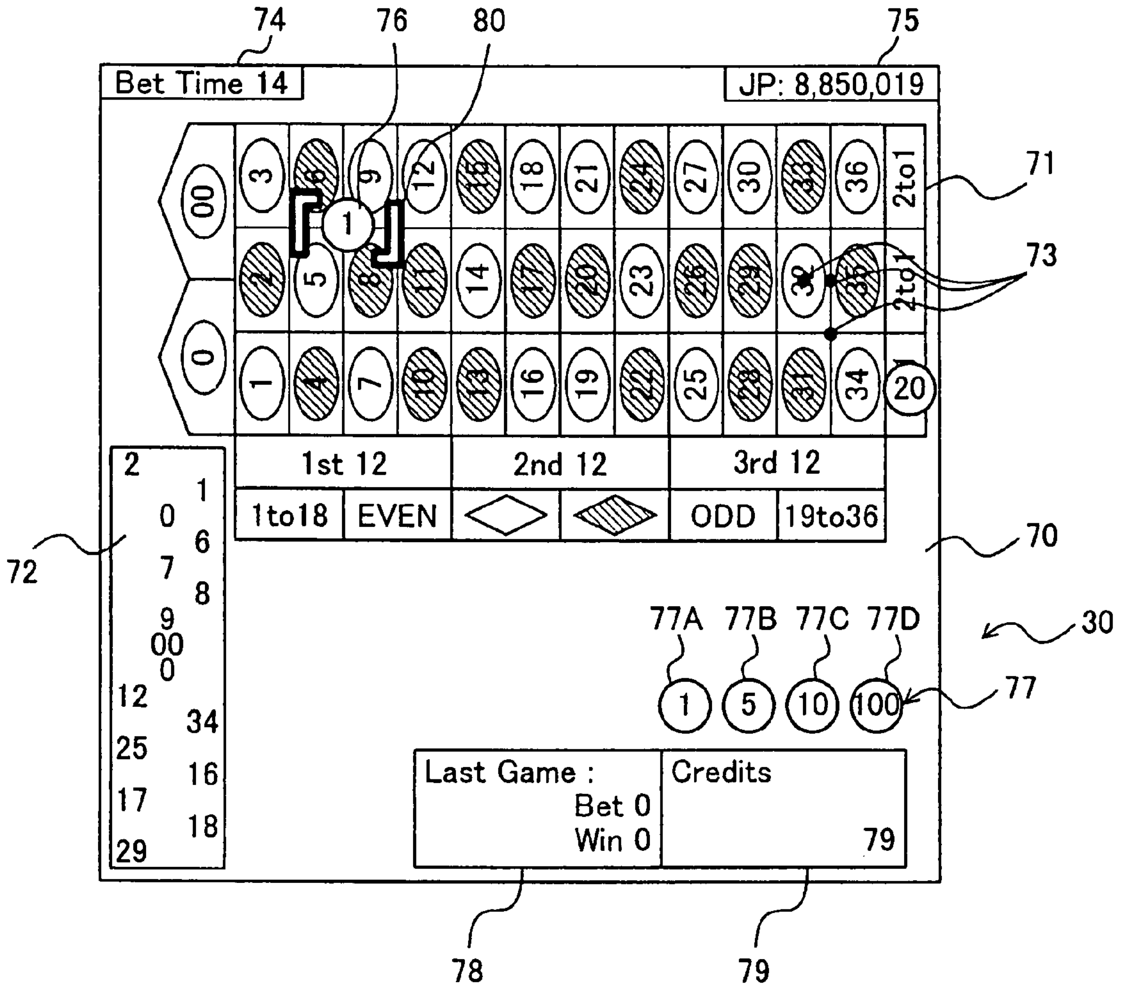
FIG. 19 is an example of display made during a bet operation in the second game on the slot machine according to one embodiment of the present invention.

In step S102, the CPU 106 displays the BET screen 70 shown in after-mentioned FIG. 19 to the liquid crystal display 30 of the slot machine 13 (step S102), and starts a waiting period (bet operation acceptance period) as a bet period in which a player can bet a chip (step S103). Further, the player is capable of operating the touch panel 32 to bet his or her chip on the BET area 73 relevant to his or her expected number during the bet period in which betting can be accepted. A place on which a bet is made and the number of times of betting differ depending upon the number of credits betted in the basic game played in the slot machine 13, as shown in the payout table for a second game (see FIG. 13), and the winning line. As the control method applied may be a method where the CPU 106 of the slot machine 13 issues bet information and the CPU 206 of the central controller 14 then performs control, or a method where, after issuing the second game start signal in step S101, the CPU 106 of the slot machine 13 receives a condition for allowing a bet as data from the central controller 14 and stores the data into the RAM 110 of the slot machine 13, to perform a control. It is to be noted that a specific bet method using the BET screen 70 is described in after-mentioned FIG. 19.

Subsequently, the CPU 106 determines through the touch panel 32 whether or not the second game BET operation with respect to the second game has been performed (step S104), and when determining that the second game BET operation has been performed, the CPU 106 issues a BET signal to the central controller 14 (step S105). The BET signals include information of betting by the player on the slot machine 13 (information showing the specified BET area 73, the number of chips (bet number) betted on the specified BET area 73, and the like).

Upon receipt of a signal (hereinafter referred to as BET status signal) concerning information showing a second game BET status (see FIG. 21) of a player other than the second game player from the central controller 14, the CPU 106 displays the BET status to the liquid crystal display 30 (step S106).

The CPU 106 determines whether or not a command for closing a second game bet from a player other than the second game player has been inputted (step S107), and when determining such a command has been inputted, the CPU 106 issues a command signal to the central controller 14 (step S108).

Subsequently, the CPU 106 determines whether or not a bet period end signal is received from the central controller 14 (step S109), and when determining that the bet period end signal has not been received, the CPU 106 returns the process to step S104 to repeatedly execute the processes of steps S104 to S108 until receiving the bet period end signal.

When determining that the bet period end signal is received in step S109, the CPU 106 finishes acceptance of the bet operation (step S110). Thereafter, a credit is paid out based upon a payout result of a credit which was received from the central controller 14 (step S111). Specifically, credit data of an amount in accordance with payout value of a roulette game is recorded into the RAM 110. The process is then shifted to step S112.

Figure 22:
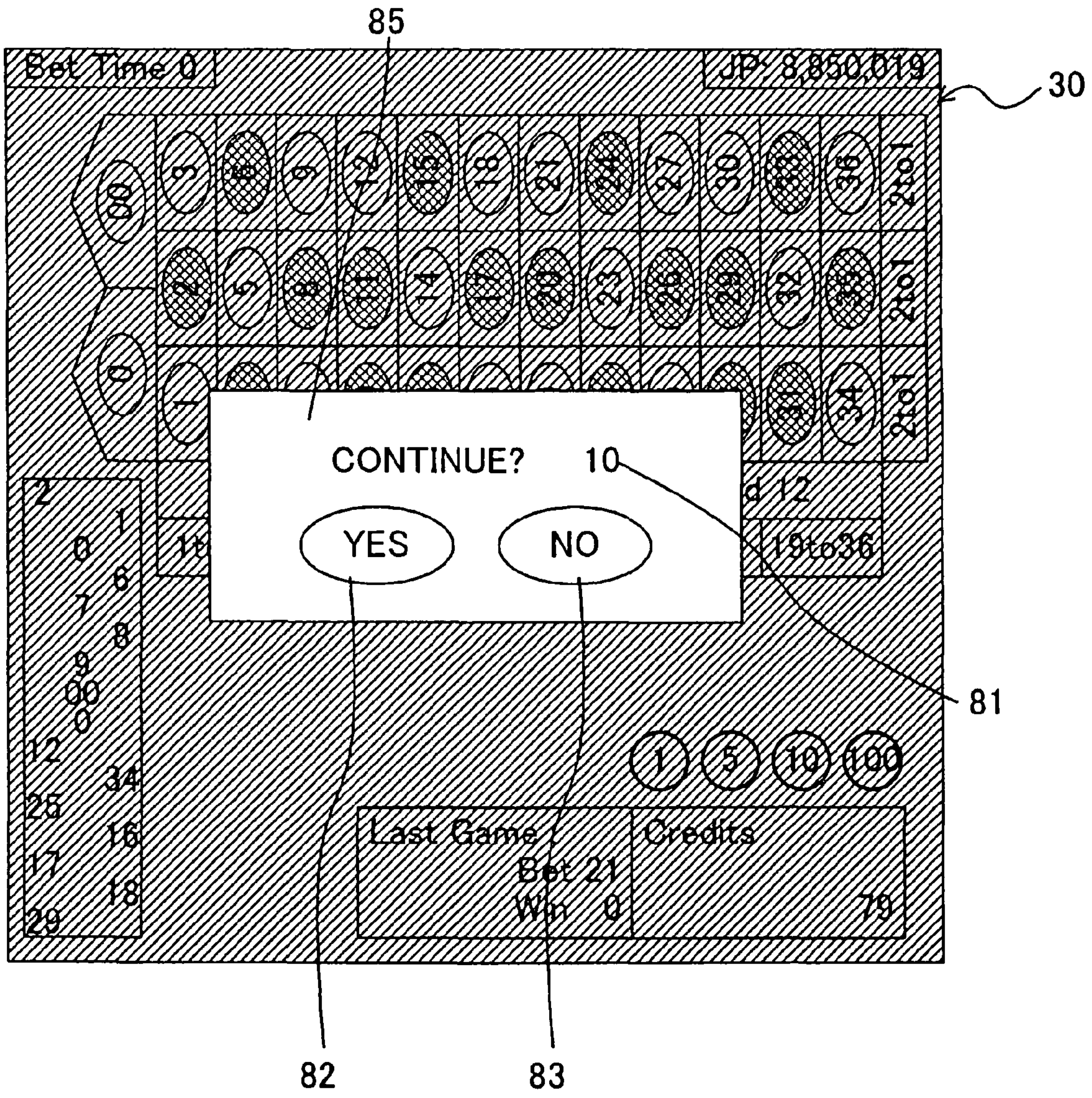
FIG. 22 is an example of display as to whether the game will be continued at the end of the game in the second game played in the slot machine according to one embodiment of the present invention.

In step S112, the CPU 106 determines whether or not the second game will be finished. Specifically, when the credit in the roulette game is left, a small window 85 as shown in after-mentioned FIG. 22 is displayed to the liquid crystal display 30, and the determination is made by selection of the player. When no credit in the roulette game is left, the player has no choice and the CPU 106 finishes the second game. When no credit is left in the roulette game or when the player selects to finish the roulette game (when determined YES in the process of step S112), the CPU 106 shifts the process to step S113. On the other hand, when a credit is left in the roulette game and the player selects to continue the roulette game (when determined NO in the process of step S112), the CPU 106 shifts the process to step S101 in FIG. 15A. Then the CPU 106 again issues the second game start signal to the central controller 14, to start a bet period, and the game is shifted to a next one.

In step S113, the CPU 106 issues a second game end signal to the central controller 14. When a credit in the roulette game is left, the CPU 106 reads the number of credits stored in the prescribed memory region for use in the basic game, and adds the credit data in accordance with a payout value of the roulette game stored in the RAM 110, to the read number of credits. The CPU 106 then stores the added value into the prescribed memory region of the RAM 110 and displays the value on the number-of-credits display section 49 of the slot machine 13. Subsequently, the CPU 106 completes the present routine. On the slot machine 13, the roulette game process is finished when the second game is finished.

Next, a second game processing program of the central controller 14 is described based upon FIGS. 15A to 15C.

Upon receipt of a second game start signal issued from the CPU 106 of the slot machine 13 in step S101, the CPU 206 issues a second game start signal to all the second game terminals 15 (step S201). Further, the CPU 206 raises the movable floor 18 on which the slot machine 13 having issued the second game start signal and a chair are fixedly mounted. Further, the CPU 206 makes a display indicating start of a second game as shown in after-mentioned FIG. 18, on the large-sized monitor 16. The rise of the movable floor 18 of the slot machine 13 and the second game start message on the large-sized monitor 16 permit not only the player on other slot machines 13, but a third person in recreation facilities to know the start of the second game. Subsequently, the CPU 206 shifts the process to step S202.

In step S202, the CPU 206 starts measurement of a waiting period as an acceptance period in which the player can bet from the time point of transmittance of the second game start signal by the slot machine 13. During this waiting period, a player of the slot machine 13 who intends to participate in the game can operate the touch panel 32 of the liquid crystal display 30 to bet his or her chip on the BET area 73 relative to his or her expected number. Further, a second game terminal 15 as described later is capable of betting on a win or loss of the second game player (player of the slot machine 13).

Upon receipt of a BET signal (signal showing contents of a second game bet on the second game player) from the second game terminal 15 after step S202, the CPU 206 stores information of the second game bet on the second game player based upon the signal, and issues a BET status signal showing the information to the slot machine 13 (step S203).

Subsequently, upon receipt of a command signal based upon a command for closing a second game BET from a player other than the second game player from the slot machine 13, the CPU 206 issues a bet period end signal to all the second game terminals (step S204). Next, the CPU 206 determines whether or not the remaining waiting period becomes five seconds. It is to be noted that the remaining waiting period is also displayed to the BET screen 70 of the second game machine 11 by means of the BET time display section 74 (see FIG. 7). When determining that the remaining waiting period is five seconds, the CPU 206 inserts the ball 65 to the inside of the roulette board. Specifically, the ball insertion device is first driven, to insert the ball 65 to the inside of the roulette board, and then the roulette device 60 performs a number determination process according to a game execution program. More specifically, the CPU 206 inserts the ball 65 and then drives a driving motor to rotate the wheel 62 at a prescribed rotational velocity in a direction opposite to the ball insertion direction. The inserted ball 65 rolls on the roulette board along the guide wall 66, and when the rotational velocity of the ball 65 is getting lower and the centrifugal force is being reduced, the ball 65 rolls down inward on the inclined face of the frame 61 to reach the rotating wheel 62 (see FIG. 7).

The ball 65 rolled onto the wheel 62 passes through the surface of the number display board 64 outside the rotating wheel 62 and held in any of the number pockets 63, and a number (any of "0", "00", "1" to "36" shown in FIG. 7) listed on the number display board 64, which corresponds to the number pocket 63 where the ball 65 is held, becomes a winning number.

Further, the CPU 206 picks up an image of the roulette device 60 with the viewpoint movable camera 17 according to insertion of the ball 65 to the inside of the roulette board, and displays the image to the monitor 16. This enables the player to see how the winning number of the roulette game is decided in the roulette game by looking at the monitor 16 without looking into the second game machine 11. Further, the screen of the monitor 16 may be divided according to need, to display both the roulette device 60 and the BET screen 70.

Thereafter, the CPU 206 determines whether or not the waiting period has been finished (step S207). When determining that the waiting period has not been finished, the CPU 206 returns the process to before step S203. On the other hand, when determining that the waiting period has been finished, the CPU 206 issues a bet period end signal indicating the end of the waiting period to the CPU 106 of the slot machine 13 and the CPU 306 of the second game terminal 15 (step S208).

Next, the CPU 206 cumulatively adds a credit corresponding to 0.5% of total credits betted using the slot machine 13 and the second game terminal 15 which were received in step S208 to an amount of JP recorded in the JP cumulative storage area of the RAM 210 (step S209). With this addition, the display of the JP display section 75 is updated.

In step S210, the CPU 206 determines that the ball 65 has been held in the number pocket 63, and then drives the winning determination device to determine which number corresponds to the number pocket 63 where the ball 65 has been held. Subsequently, the CPU 206 shifts the process to step S211.

In step S211, the CPU 206 determines whether or not the chip betted on the slot machine 13 is winning from the number of the pocket where the ball 65 is held which is determined in step S211 and the bet information of the slot machine 13. Further, in step S211, the CPU 206 determines whether or not the player operating the second game terminal 15 has won based upon the win or loss of the player playing the second game on the slot machine 13 and the bet information of the second game terminal 15. Subsequently, the CPU 206 shifts the process to step S212.

In step S212, the CPU 206 executes a payout determining process. In the payout determining process, the CPU 206 identifies winning chips betted on the winning number on each of the slot machines 13, and uses a payout cover (number of credits to be paid out per one chip (one bet)) with respect to each of the BET areas 73 of the payout table for a second game stored in the payout credit storage area of the ROM 208, to calculate the total payout amount of the credit to be paid out to the slot machine 13. Moreover, the CPU 206 calculates a payout amount of winning credits to be paid out to the winning second game terminal 15. Further, information of the winning number, the number of winners and the like are displayed to the monitor 16.

Next, the CPU 206 executes a process for issuing a credit payout result in the roulette game based upon the payout value determination process in step S212. Specifically, the CPU 206 outputs credit data corresponding to the payout amount to the winning slot machine 13 and second game terminal 15. Subsequently, the CPU 206 shifts the process to step S214.

In step S214, the CPU 206 drives the ball collection device provided below the wheel 62 to collect the ball 65 on the wheel 62. The collected ball 65 is again inserted into the wheel 62 of the roulette device 60 in a next or later game. Thereafter, upon receipt of a second game end signal from the slot machine 13, the CPU 206 lowers the movable floor 18, to complete the present routine.

Finally, a second game processing program of the second game terminal 15 is described based upon FIGS. 15A to 15C.

In step S301 of FIG. 15A, the CPU 306 of the second game terminal 15 receives a second game start signal issued from the central controller 14.

The CPU 306 of the second game terminal 15 displays the after-mentioned BET screen 70 (see FIG. 20) to the display 93 based upon the second game start signal (step S301), and starts a waiting period as a bet period in which a second game bet can be made on a second game player (step S302). During this bet period in which a second game bet can be accepted, the player can operate the touch panel 99 to bet on the win or loss of the second game player.

Subsequently, the CPU 306 determines through the touch panel 99 whether or not the second game BET operation has been performed on the win or loss of the second game player (step S303), and when determining that the second game BET operation has been performed, the CPU 306 issues a BET signal to the central controller 14 (step S304). The BET signal includes information of the second game bet made by the player on the second game terminal 15 (information of a game result (win or loss) of a specified player, the number of betted credits, and the like).

Subsequently, the second game terminal 15 determines whether or not the bet period end signal has been received (step S305), and when determining that the bet period has not been received, the second game terminal 15 returns the process to step S303, and repeatedly executes the processes of Steps S303 to S304 until the bet period end signal is received. It is to be noted that the bet period end signal is issued to the second game terminal 15 in the cases of (I) and (II) below.

(I) Case in which the central controller 14 issues the bet period end signal to the second game terminal 15 based upon a command signal (step S108) issued by the slot machine 13 when a command for closing a second game bet from a player other than the second game player is inputted into the slot machine 13 (step S204), and (II) Case in which the second game terminal 15 receives the bet period end signal issued by the central controller 14 when the waiting period is finished on the central controller 14 (step S208).

In the case of (I) above, even when the waiting period is finished on the second game terminal 15, the waiting period is not finished on the slot machine 13 until the bet period end signal (step S208) issued from the central controller 14 is received. Meanwhile, in the case of (II) above, the waiting period is finished simultaneously on the slot machine 13 and the second game terminal 15.

In step S305, when it is determined that the bet period end signal has been received, acceptance of the bet operation is finished (step S306). Thereafter, the CPU 306 of the second game terminal 15 pays out a credit based upon a credit payout result received from the central controller 14 (step S307).

Figure 16:
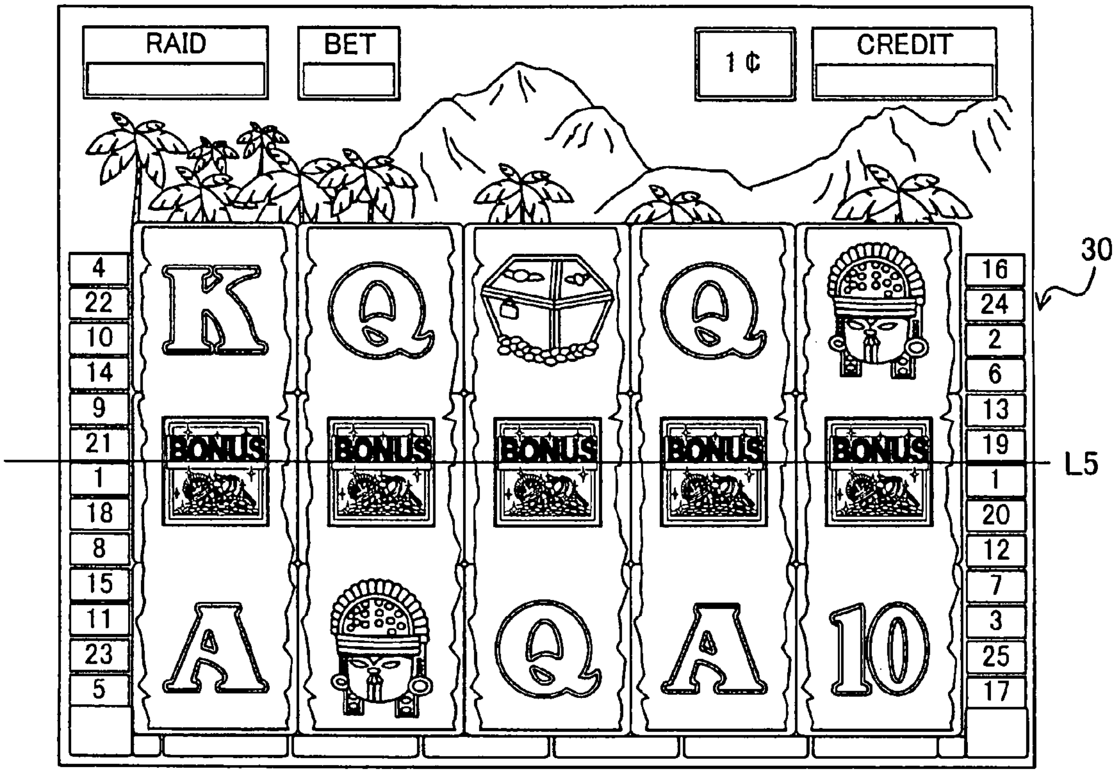
FIG. 16 is an example of display when a symbol combination of "BONUS" is stopped on a winning line L5 in a display region in the basic game on the slot machine according to one embodiment of the present invention.
Figure 17:
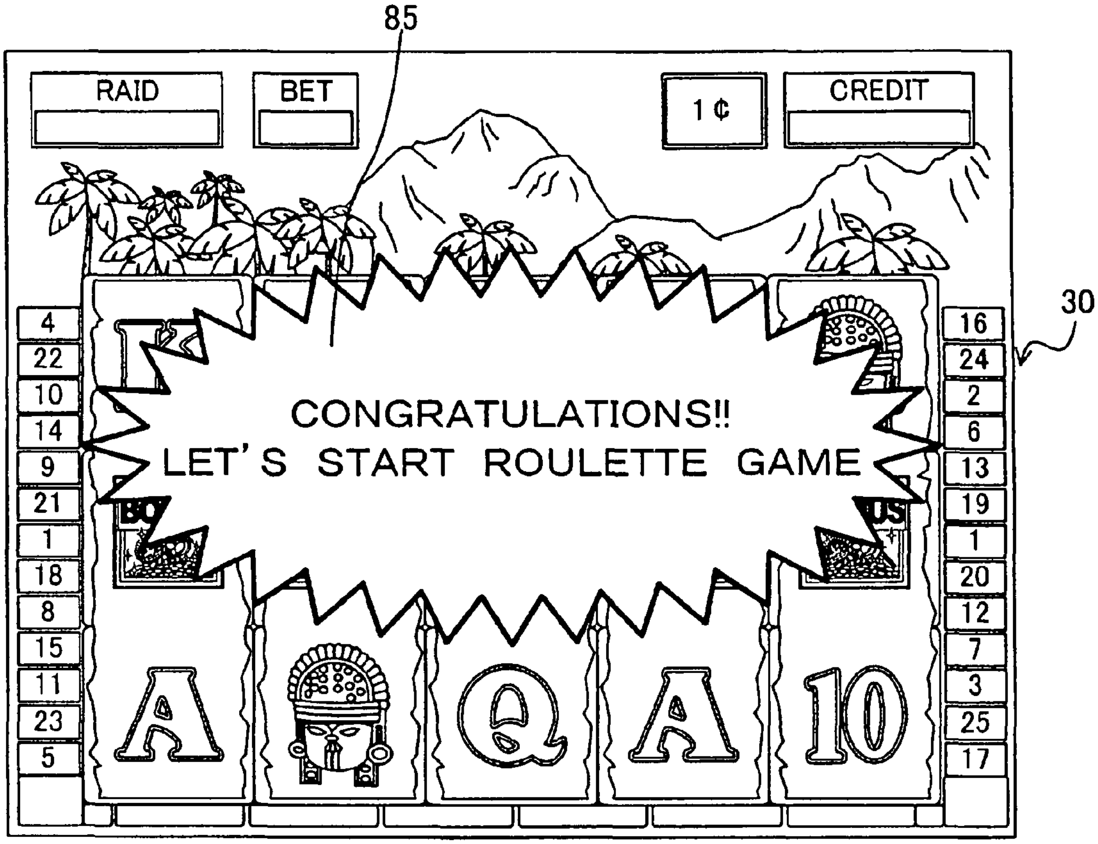
FIG. 17 is an example of display made after display of the figure of FIG. 16 in the basic game on the slot machine according to one embodiment of the present invention.

FIGS. 16 and 17 each show an example of display of the basic game to the slot machine 13 in the present embodiment. Symbols are stopped and displayed to the liquid crystal display 30 of the slot machine 13. In the case of this example, the symbols "BONUS" are aligned sideways at the central portion, and "BONUS" is established by the winning line L5. As described above, when "BONUS" is established, the game is shifted to a second game. Therefore, as shown in FIG. 17, a small window 85 including letters "CONGRATULATIONS!! LET'S START ROULETTE GAME" is displayed to the liquid crystal display 30.

Figure 18:
FIG. 18 is an example of display made on a monitor at the start of the second game according to one embodiment of the present invention.

FIG. 18 shows an example of display encouraging participation in the second game which is made to the large-sized monitor 16 at the start of the second game. As shown in the figure, with the display of "LET'S JOIN ROULETTE GAME!" to the large-sized monitor 16, a third person inside the recreation facilities can participate in the roulette game using the second game terminal 15. Further, sound is emitted from a speaker provided to the right and left of the large-sized monitor 16 as shown in FIG. 2 to make announcement to the third person further effectively.

FIG. 19 shows an example of display made to the liquid crystal display 30 when the bet operation is performed in the roulette game, as an example of display of a second game to the slot machine 13. A description is made based upon FIG. 19 except for the description made in foregoing FIG. 7.

First, this BET screen 70 is displayed to the liquid crystal display 30 of the slot machine 13. Below the betting board 71 displayed to the BET screen 70, a result history display section 72, a unit BET button 77, a payout number display section 78, and a number-of-credits display section 79 are displayed in the order from the upper left of the screen. The payout number display section 78 and the number-of-credits display section 79 are sections provided in the roulette game, and different from the payout number display section 48 and the number-of-credits display section 49 on the slot machine 13.

The unit BET button 77 is a button for betting a chip on the BET area 73 (on a square of a number or a mark, or on a line forming squares). The unit BET button 77 consists of four kinds of buttons: 1 BET button 77A, 5 BET button 77B, 10 BET button 77C and 100 BET button 77D.

The player first directly presses the BET area 73 for betting on the screen with the finger or the like, to specify with an after-mentioned cursor 80. In that state, when pressing the 1 BET button 77A, the player bets one chip each (the number of chips to bet increases in the order of 1, 2, 3, . . . every time the 1 BET button 77A is pressed with the finger or the like) When pressing the 5 BET button 77B, the player bets five chips each (the number of chips to bet increases in the order of 5, 10, 15, . . . every time the 5 BET button 77B is pressed with the finger or the like). When pressing the 10 BET button 77C, the player bets ten chips each (the number of chips to bet increases in the order of 10, 20, 30, . . . every time the 10 BET button 77C is pressed with the finger or the like). When pressing the 100 BET button 77D, the player bets 100 chips each (the number of chips to bet increases in the order of 100, 200, 300, . . . every time the 100 BET button 77D is pressed with the finger or the like).

Therefore, even when a large number of chips are to be betted, it is possible to facilitate the operation for such betting. In addition, one coin for use in the basic game played in the slot machine 13 corresponds to one chip for use in the second game. Further, the number of places on which the chip is betted is not limited to one. After pressing the unit BET button, the player can specify the BET area 73 again to perform the bet operation on a plurality of places.

Further, the payout number display section 78 displays the bet number of chips of the player in the previous game and the number of credits to be paid out. Here, the number obtained by subtracting the bet number from the number of credits to be paid out is the number of credits newly acquired by the player in the previous game. In this example of display since this is the first game after the game has been shifted to the second game on the slot machine 13, the bet number and the number of credits to be paid out are both "0".

Moreover, the number-of-credits display section 79 displays the number of credits owned by the current player. When a chip is betted, this number of credits decreases in accordance with the bet number (one credit with respect to one bet). When the betted chip wins and the credit is paid out, the number of credits increases by the number of the credit paid out. It is to be noted that when the number of credits owned by the player becomes "0", the game is finished. This example of display shows the case of shifting the game to the second game when the number of credits is "1" on the slot machine 13, and since "20" chips are betted on "2 to 1" with "1", "4", "7", "10" . . . and "1" chip is betted on four numbers of "5", "6", "8" and "9", "79" which was obtained by subtracting "21(20+1)" from "100" as the chip number when the game was shifted is displayed as the number of credits.

Further, the cursor 80 showing the BET area 73 selected by the current player is displayed to the betting board 71. When the player makes a bet on the BET screen 70 configured in the foregoing manner, first, the BET area 73 on which a bet is made (on a square of a number or a mark, or on a line forming squares) is specified on the screen and then directly pressed with the figure. As a result, the cursor 80 shifts to the specified BET area 73.

Thereafter, each of the unit buttons 77 (1 BET button 77A, 5 BET button 77B, 10 BET button 77C, and 100 BET button 77D) is pressed to bet chips in number selected by means of the pressed unit button on the specified BET area 73. For example, when the 10 BET button 77C is pressed four times, the 5 BET button 77B is pressed once and the 1 BET button 77A is pressed three times, the total of 48 chips can be betted. Such a function allows the player to perform the bet operation by operation of the terminal at hand.

Figure 20:
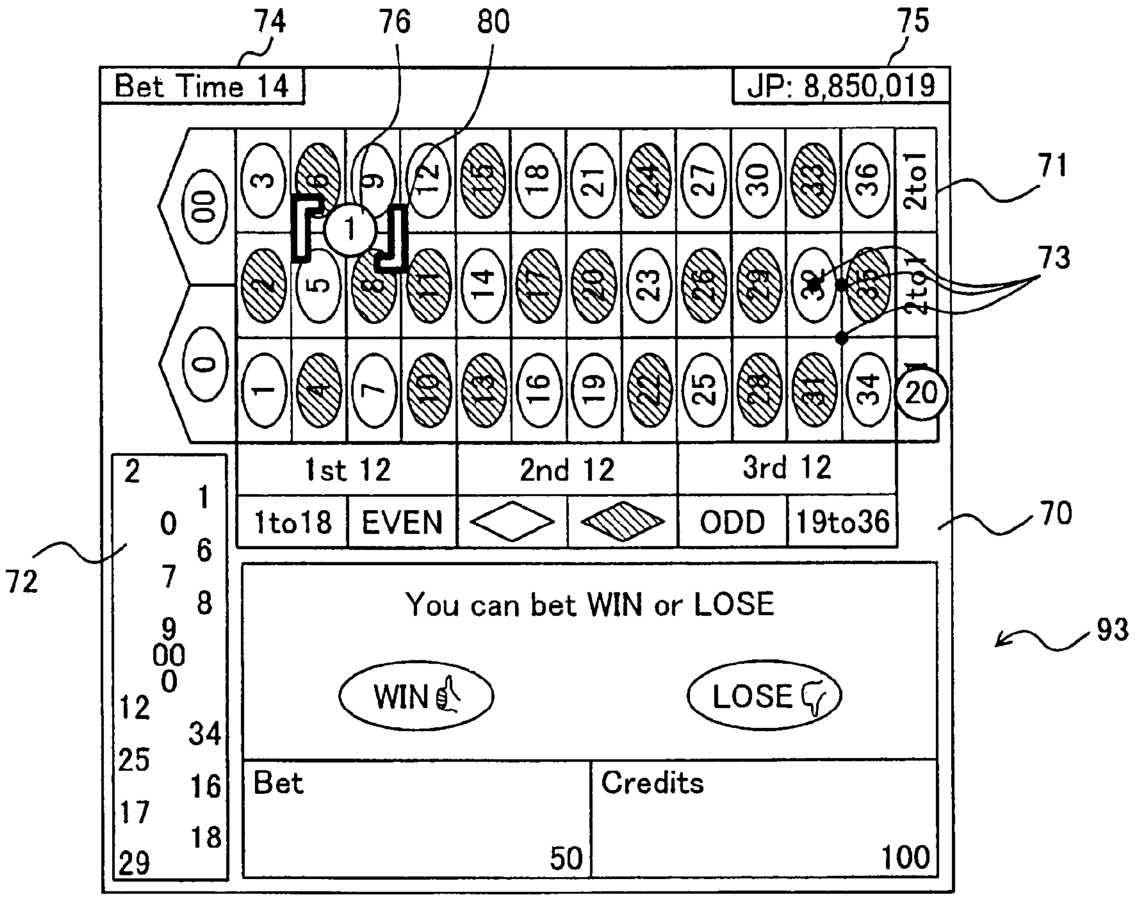
FIG. 20 is an example of display made during a bet operation on the second game terminal according to one embodiment of the present invention.

FIG. 20 shows an example of display made to the display 93 of the second game terminal 15. The BET screen 70 displayed to the display 93 is generally the same as the image on the slot machine 13 (see FIG. 19), but an image as described below is placed on the lower right. Namely, on the display 93, an image showing "You can bet WIN or LOSE" is displayed along with an image showing "WIN" and "LOSE". Further, the bet number and the number of credits are also displayed. The player who operates the second game terminal 15 can touch "WIN" or "LOSE" through the touch panel 99 to bet the win or loss of a second game player. In addition, only the case of conducting a second game bet on the second game player by the use of the second game terminal 15 was described in the present embodiment, naturally, the second game terminal 15 can directly participate in the second game.

Figure 21:
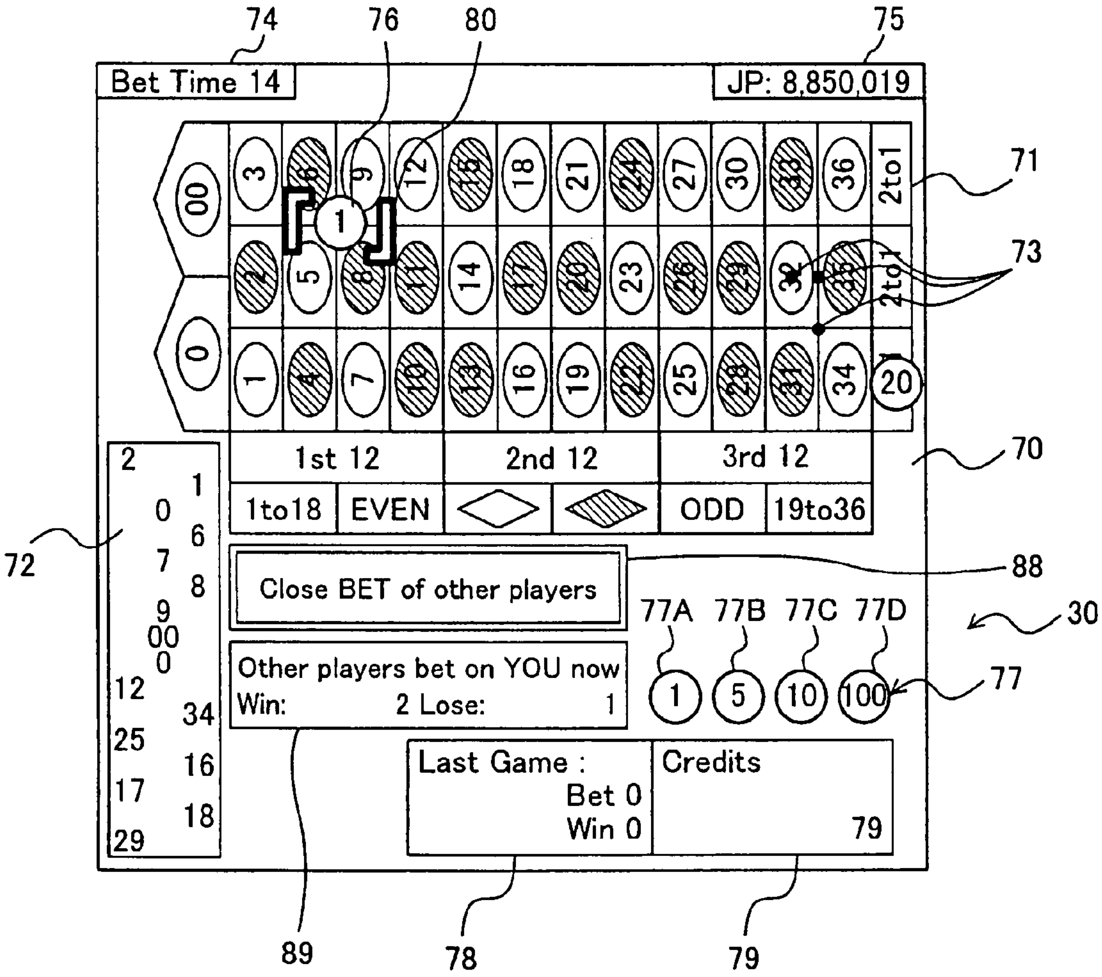
FIG. 21 is an example of display of a second game bet status in the second game on the slot machine according to one embodiment of the present invention.

FIG. 21 is an example of display of a second game bet status in the second game played in the slot machine according to one embodiment of the present invention.

The image displayed at this time is substantially the same as the image shown in FIG. 19, but is different in the following respect. Namely, an image 88 for command input showing "Close BET of other players" is displayed at the central part of the screen. The player can touch the image 88 for command input through the touch panel 32 to input the command for closing a second game bet from a player other than the second game player. Further, below the image 88 for command input, a bet status image 89 is displayed which shows the number of players other than the second game player having betted on the win of the player is two and the number of players other than the second game player having betting on the loss of the player is one.

Figure 23:
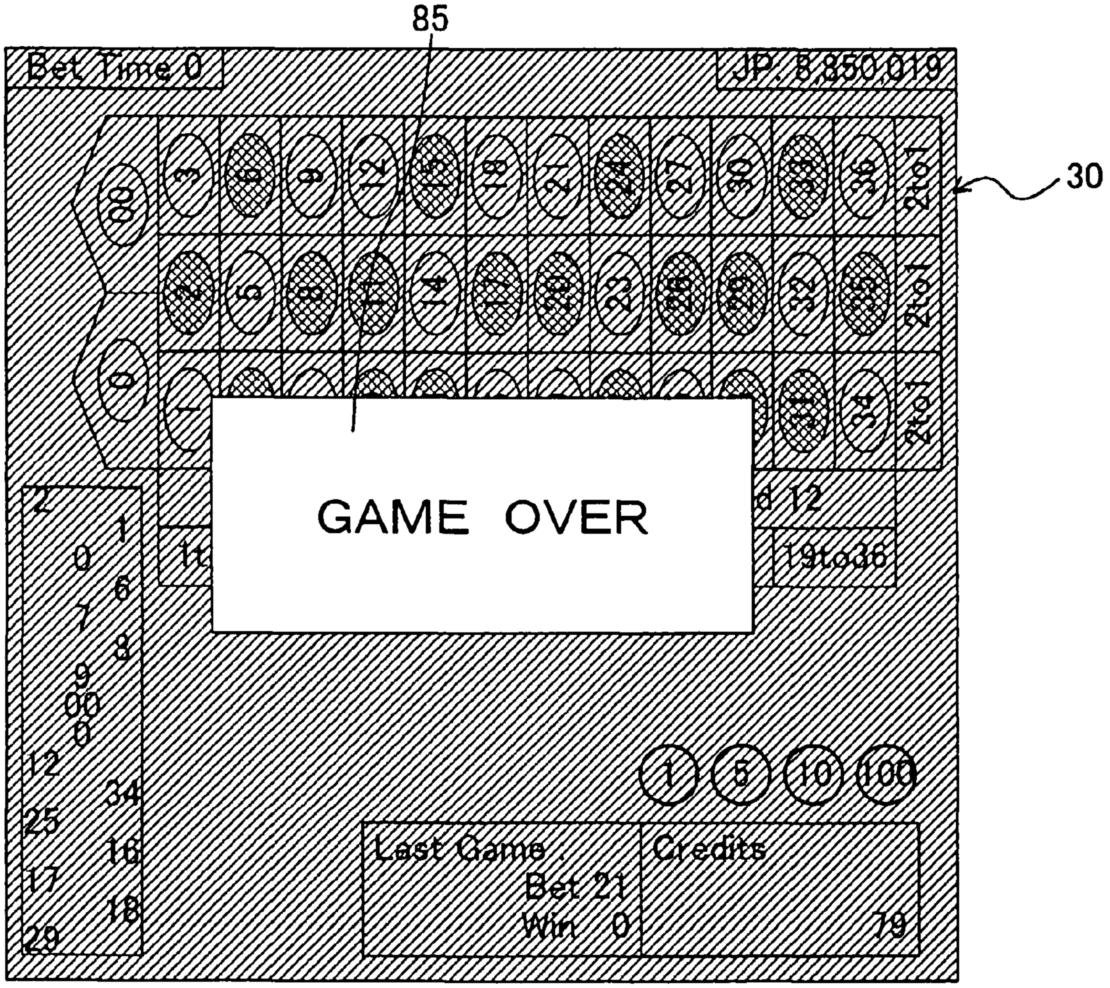
FIG. 23 is an example of display of game-over in the second game played in the slot machine according to one embodiment of the present invention.

FIGS. 22 and 23 each show display of the liquid crystal display 30 after the payout process in step S111 in foregoing FIG. 15C. The display of FIG. 22 is made to the liquid crystal display 30 of the slot machine 13 when the credit is left in the roulette game. The small window 85 asking the player whether or not to continue the game is displayed at the center of the image, and a countdown number 81 is displayed to the upper right of the image. The number is counted down from "10" in the order of "10", "9", "8" . . . . When either an YES button 82 or a NO button 83 is not pressed on the touch panel 32 until the number is counted down to "0", or when the NO button 83 is pressed during the countdown, it is determined to finish the roulette game and the small window 85 as shown in FIG. 23 notifying that the game is finished is displayed. Further, when no credit is left in the roulette game, the display of FIG. 23 is made to the liquid crystal display 30 without the intermediary of FIG. 22, and the roulette game is finished.

As thus described, in the game system and the playing method according to the present embodiment, in a case where the basic game is on play on the slot machine 13, a roulette game to be played on the second game machine 11 is started when a prescribed combination of symbols, such as "BONUS", is stopped on the winning line L5. In this case, the slot machine 13 turns into a terminal capable of performing the bet operation in the roulette game. Further, a credit to be imparted by the combination "BONUS" in the basic game is used in the roulette game. The roulette game is finished mostly when the player intends to finish the game or no credit for betting is left. Hence the roulette game can be played a number of times depending upon the playing method of the player.

Figure 24:
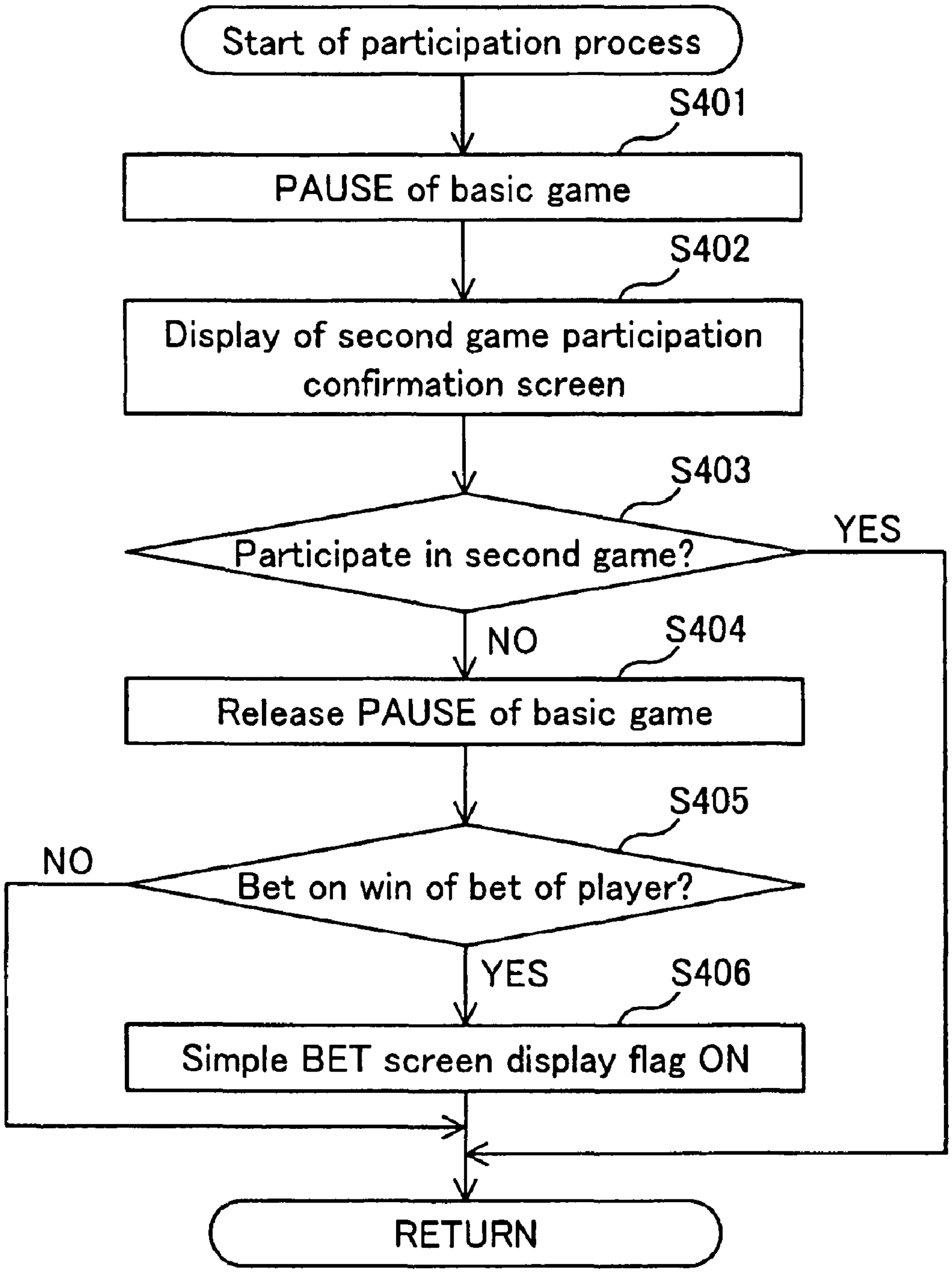
FIG. 24 is a flow chart showing a flow of operations for a participation process in a second game to be played in a game system according to another embodiment of the present invention.

In the foregoing embodiment, the case was described where the device capable of conducting a second game bet on the win or loss of the second game player is the second game terminal 15. However, the present invention is not limited to this example. Another slot machine 13 may be used in place of the second game terminal 15. When a second game bet on the win or loss of the second game player can be made on another slot machine 13, the process shown in FIG. 24 is performed prior to the process of step S301 in FIG. 15A, and the processes of FIGS. 15A to 15C may be performed on another slot machine 13. The processes of FIGS. 15A to 15C have already been described, and the descriptions thereof are thus omitted here.

FIG. 24 is a flow chart showing a participation process performed on the slot machine 13 according to another embodiment of the present invention.

In step S401, the CPU 106 of the slot machine 13 brings the basic game process to a pause. Thereafter, the CPU 106 shifts the process to step S402. In step S402, the CPU 106 displays the liquid crystal display 30 to a second game participation confirming screen on the liquid crystal display 30 as shown in the lower figure of after-mentioned FIG. 25. Thereafter, the process is shifted to step S403.

In step S403, the CPU 106 determines whether or not to participate in the second game. In the case of participating in the second game (when determined YES in the process of step S403), the CPU 106 completes the present routine, and another slot machine 13 directly participates in the second game. Namely, during play of the second game, the basic game having played by the player comes into a pause state. On the other hand, in the case of not participating in the second game (when determined NO in the process of step S403), the CPU 106 shifts the process to step S404.

Figure 26:
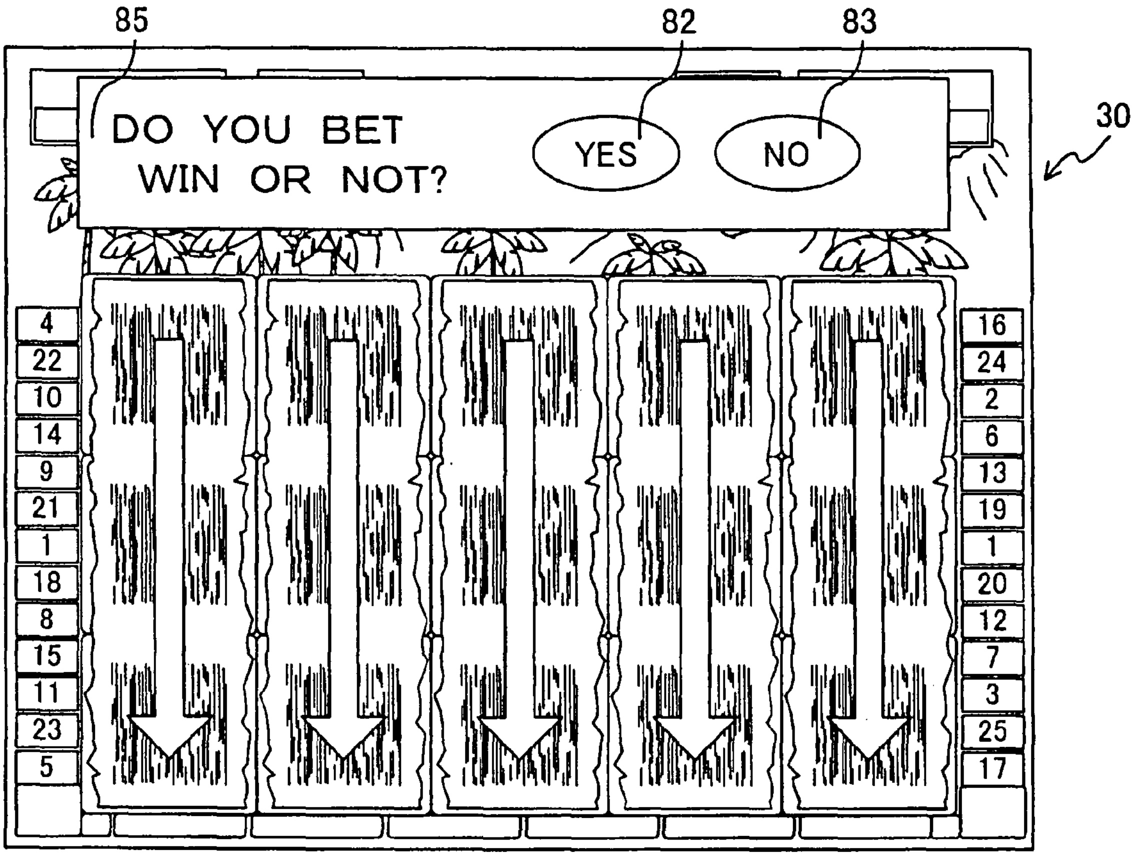
FIG. 26 is an example of display of a screen for accepting participation in betting on a win or loss of the second game played in the slot machine where the basic game is on play in the second game according to another embodiment of the present invention.

In step S404, the CPU 106 releases the pause of the basic game process. Subsequently, the CPU 106 shifts the process to step S405. In step S405, the CPU 106 displays the small window 85 as shown in FIG. 26, to determine whether or not to bet on the win or no-win of betting of the player on the main slot machine 13. In the case of betting (when determined YES in the process of step S405), the CPU 106 shifts the process to step S406. On the other hand, in the case of not betting (when determined NO in the process of step S405), the CPU 106 completes the present routine. In this case, the CPU 106 of the slot machine 13 continuously controls the basic game.

Figure 27:
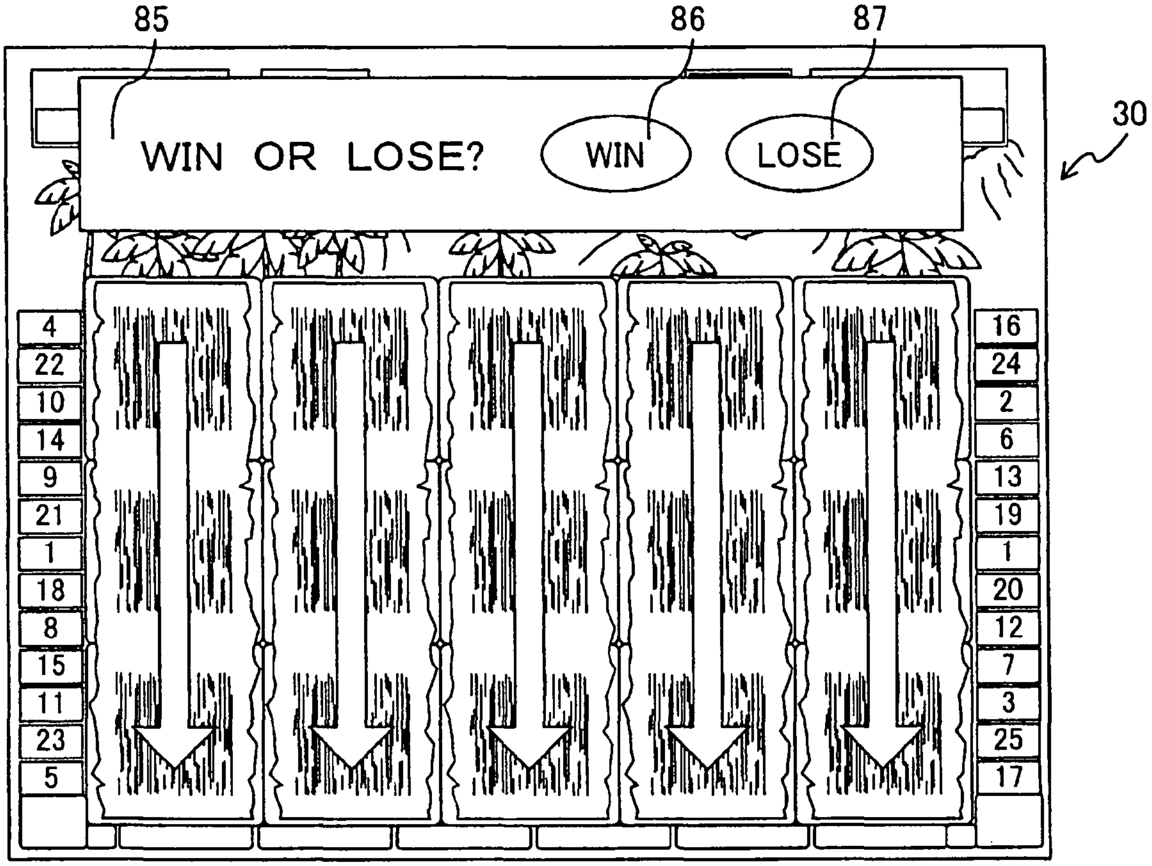
FIG. 27 is an example of display of a screen on which a bet on a win or loss is made when the bet is made on the win or loss of the second game played in the slot machine where the basic game is played in the second game according to another embodiment of the present invention.

In step S406, the CPU 106 displays the small window 85 of a simple BET screen to the liquid crystal display 30 as shown in FIG. 27, and sets a simple BET screen display flag stored in the RAM 110 to ON according to selection of either win or loss by the player. Thereafter, the CPU 106 completes the present routine. It is to be noted that the simple BET screen display flag serves to determine whether or not a simple bet was made on the win or no-win of betting of the player of the main slot machine 13, and is turned ON when the simple bet is made and is updated to OFF when the unit game is finished.

Figure 25:
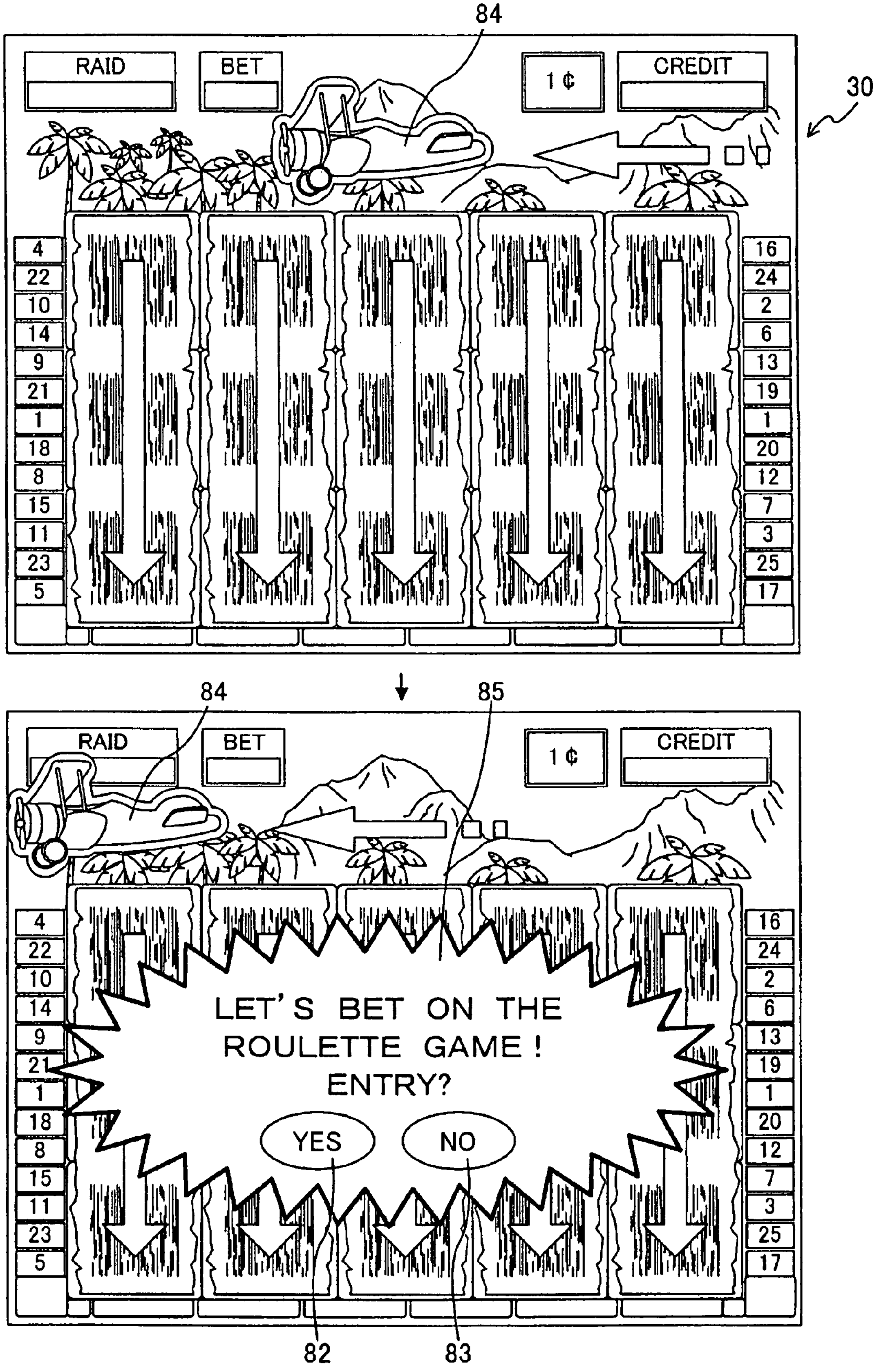
FIG. 25 is an example of display of a screen for accepting participation in the second game to be played in the slot machine where a basic game is on play in a second game according to another embodiment of the present invention.

FIG. 25 shows display of the liquid crystal display 30 in step S402 in foregoing FIG. 24. The upper figure of FIG. 25 is display of a scene of an airplane 84 flying from the upper right to the liquid crystal display 30 of the slot machine 13 on which the basic game is played. It is possible by the presentation effect of the airplane 84 to lead the player to expecting that something will happen. Thereafter, as in the lower figure of FIG. 25, the small window 85 is displayed when the airplane 84 flies away to the left. The small window 85 displays "LET'S BET ON THE ROULETTE GAME!", together with buttons for selecting to participate or not. When the YES button 82 is pressed, the slot machine 13 is controlled to play the roulette game. On the other hand, when the NO button 83 is pressed, the basic game can be continuously played.

FIG. 26 shows a screen displayed to the liquid crystal display 30 of the slot machine 13 on which not participating in the roulette game was selected after release of the pause of the basic game process in step S404 in foregoing FIG. 24. The small window 85 is displayed on which whether or not to bet on the win or loss of betting of the player of the main slot machine 13 can be selected. "DO YOU BET WIN OR NOT?" is displayed together with buttons with which participation or not can be selected. When the YES button 82 is pressed, the small window 85 as shown in FIG. 27 is displayed. When the NO button 83 is pressed, the screen of FIG. 26 is closed.

FIG. 27 shows a screen of a simple bet displayed when the YES button 82 is pressed on the screen of FIG. 26. Either win or loss can be selected on the small window 85, and the player presses a WIN button 86 or a LOSE button 87. This bet can be made using a prescribed credit, and when the player wins the bet, the prescribed credit is added to the credit of the basic game.

As thus described, in the game system and the playing method according to the present embodiment, during play of the basic game on the slot machine 13, for example when a prescribed combination of symbols such as "BONUS" is stopped on the winning line L5, a roulette game to be played on the second game machine 11 independent of the slot machine 13 is started. In this case, the slot machine 13 turns into a terminal capable of performing the bet operation in the roulette game. Further, the slot machine 13 on which the basic game is played and the prescribed combination of symbols such as "BONUS" is not stopped and displayed can also participate in the roulette game. The credit imparted in the basic game due to the combination of "BONUS" is also usable in the roulette game. The payout value of the roulette game can be issued to the slot machine 13 so as to be used in the basic game played in the slot machine 13. The roulette game is finished when the player intends to finish the play of the roulette game, or no credit for betting is left. Hence the roulette game can be played a number of times depending upon the playing method of the player.

Further, a plurality of terminals 15 for a second game exclusively for a roulette game, which can participate in a roulette game, is provided. With the second game terminals 15 provided, a third person in amusement facilities can participate only in the roulette game even when not playing a game on the slot machine 13, so that interests of the person in the game can be enhanced.

Further, in the roulette game, rules of a place for betting, whether or not to accept betting on a plurality of places in one play etc., and a payout value for winning, are determined using the payout table for a second game. The payout table for a second game can be set differently in each of the terminals where a game is played, and further, the payout cover can be changed depending upon a condition in the basic game. Therefore, it is possible to make a variety of settings so as to improve interests of the player in the game.

Further, on the opportunistic-play slot machine 13, it is possible to make a bet in the roulette game while playing the basic game. The bet is made, for example, on the win or no-win of betting of the player mainly playing the roulette game on the slot machine 13. In this manner, since a plurality of players can participate in the roulette game without suspension of play by the player of the basic game, the enjoyment of the plays can be shared among them.

In the foregoing two embodiments, the case was described where the command for closing a second game bet from a player other than the second game player can be inputted by the player within a waiting period before start of the second game. However, the present invention is not limited to this embodiment. The game system of the present invention may be configured such that the player can select acceptance or refusal of a second game bet every time the second game bet is inputted from a player other than the second game player. In the case of adopting such a configuration, the process of after-mentioned FIG. 28 may be executed in place of the process of FIG. 15B.

Figure 28:
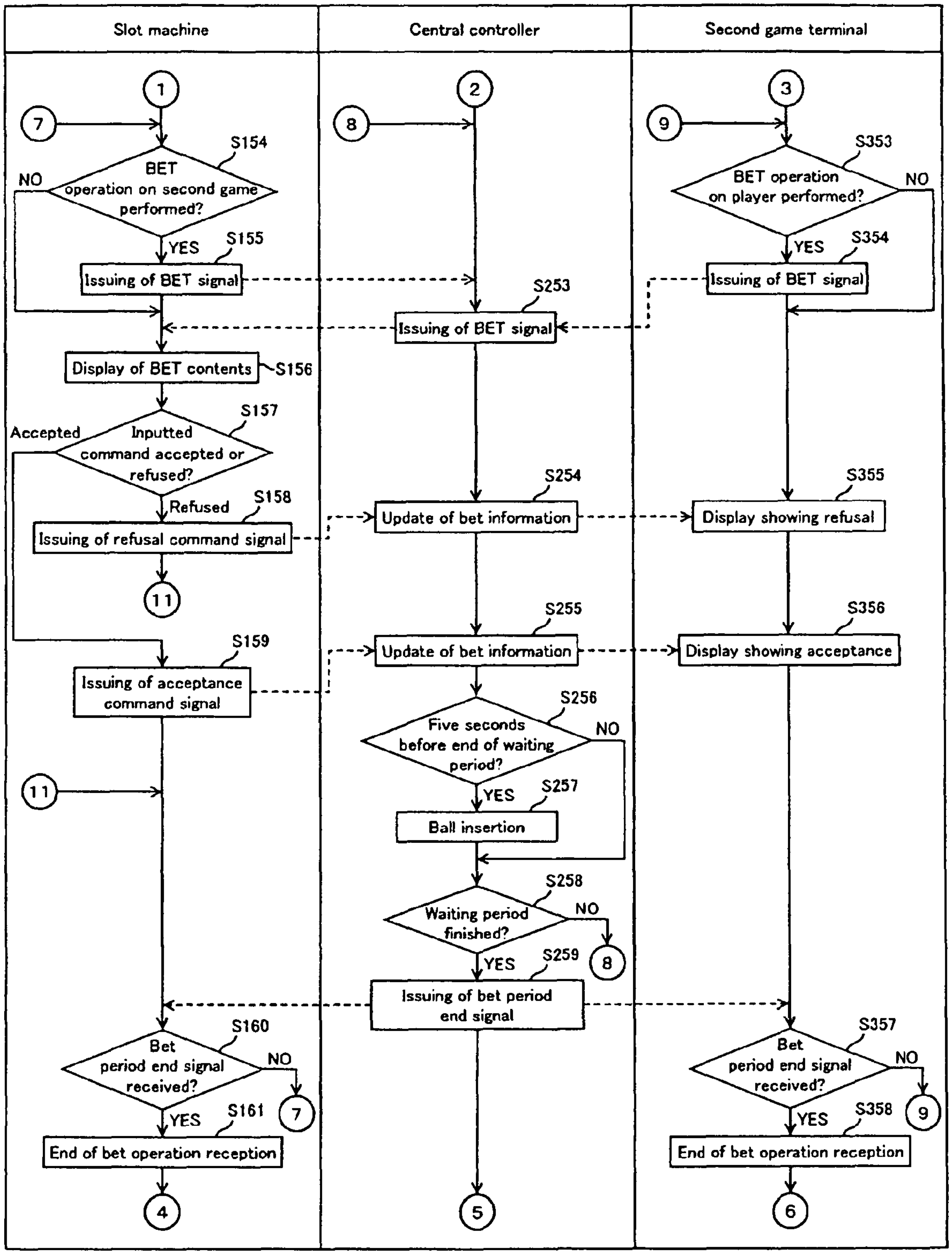
FIG. 28 is a flow chart showing a flow of process operations in the second game played in the game system according to another embodiment of the present invention.

FIG. 28 is a flow chart showing a flow of process operations in the second game of the game system according to another embodiment of the present invention.

The CPU 106 of the slot machine 13 determines whether or not the second game BET operation has been performed on the second game (step S154) after start of acceptance of the bet operation (step S103), and when determining that the second game BET operation has been performed, the CPU 106 issues a BET signal showing contents of the second game bet to the central controller 14 (step S155).

Further, the CPU 306 of the second game terminal 15 determines whether or not the second game BET operation has been performed on the second game player (step S353) after start of acceptance of the bet operation (step S302), and when determining that the second game BET operation has been performed, the CPU 306 issues a BET signal showing contents of the second game bet to the central controller 14 (step S354).

The CPU 206 of the central controller 14 issues the BET signal from the second game terminal 15 to the slot machine 13 (step S253)

The CPU 106 of the slot machine 13 displays contents of the second game bet to the liquid crystal display 30 based upon the received BET signal (step S156).

Figure 29:
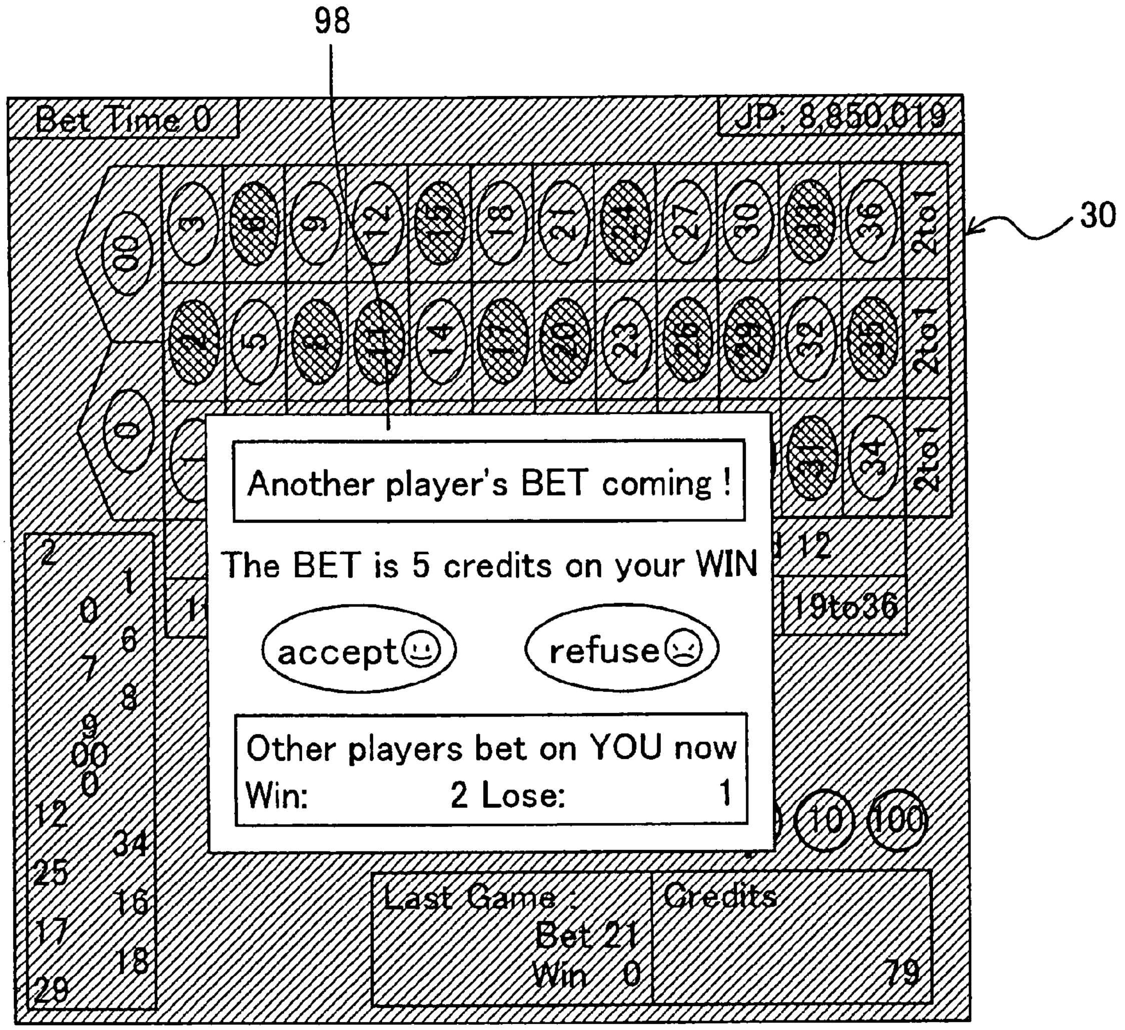
FIG. 29 is an example of display of a second game bet status in the second game played in the slot machine according to another embodiment of the present invention.

FIG. 29 is a view showing an example of display of second game bet contents.

An image 98 showing the second game bet contents includes an image showing that the second game bet has been made by a player other than the second game player, an image showing contents of the second game bet, and an image showing a current second game bet status. Further, the image 98 includes an image showing "accept" and "refuse". The player can touch "accept" or "refuse" to input a command as to whether to accept or refuse the second game bet from a player other than the second game player through the touch panel 32.

After the process of step S156, whether the inputted command is acceptance or refusal of the second game bet is determined (step S157). In a case where the command is refusal of the second game bet, the slot machine 13 issues a refusal command signal indicative of the refusal command (step S158). The CPU 206 of the central controller 14 which received the refusal command signal updates the bet information (step S254) based upon the signal, and issues the signal to the second game terminal 15 from which the BET signal was issued. On the second game terminal 15, the display 93 displays the refusal of the second game bet (step S355).

On the other hand, when the inputted command is determined to be acceptance of the second game bet in step S157, the slot machine 13 issues an acceptance command signal indicative of the acceptance command (step S159). The CPU 206 of the central controller 14 which received the acceptance command signal updates the bet information (step S255) based upon the signal, and issues the signal to the second game terminal 15 from which the BET signal was issued. On the second game terminal 15, the display 93 displays the acceptance of the second game bet (step S356).

Subsequently, the CPU 206 of the central controller 14 determines whether or not five seconds are left until the end of the waiting period (step S256), and when five seconds are left, the ball is inserted (step S257). Next, the CPU 206 determines whether or not the waiting period is finished (step S258), and when the waiting period has not been finished, the CPU 206 returns the process to step S253. Meanwhile, when the waiting period has been finished, the CPU 206 issues a BET period end signal to the slot machine 13 and the second game terminal 15 (step S259), and makes the process proceed to step S209 (see FIG. 15C).

Upon receipt of the bet period end signal from the central controller 14 (step S160: YES), the CPU 106 of the slot machine 13 performs a process for closing acceptance of the bet operation (step S161), and makes the process proceed to step S111 (see FIG. 15C).

Further, upon receipt of the bet period end signal from the central controller 14 (step S357: YES), the CPU 306 of the second game terminal 15 performs a process for closing acceptance of the bet operation (step S358), and makes the process proceed to step S307.

While the embodiments of the game system according to the present invention were described above, those were mere descriptions of specific examples and do not particularly limit the present invention, and the specific configuration of each of the means and the like can be changed in design as appropriate. Further, while the effects were described in the embodiments of the present invention, it was mere listing of the most preferred effects exerted according to the present invention, and hence the effect of the present invention is not limited to those described in the embodiments of the present invention.

For example, while the roulette game was described as the second game, this does not limit the second game, and a bet game such as a card game like poker or quiz may be played as the second game. Further, while the case was described where a bet can be made on a win or loss of a player in the present embodiment, the present invention is not limited to this example, and for example, it may be configured so as to allow betting on a player expected to win out of a plurality of players playing the second game (roulette game).

Although the embodiment according to the present invention has been described, the description presents only some of the specific examples, and is not intended to limit the present invention in any way and specific constructions of each means and the like can be properly changed in terms of design. Besides, the effects described in the embodiment of the present invention are only the most preferable effects generated from the present invention and effects to be caused by the present invention is not limited to those described in the embodiment of the present invention.

There has thus been outlined, rather broadly, the more important features of the invention in order that the detailed description thereof aforementioned may be better understood, and in order that the present contribution to the art may be better appreciated. There are, of course, additional features of the invention that described above and which formed the subject matter of the claims appended hereto.

In this respect, above explaining at least one embodiment of the invention in detail, it is to be understood that the invention is not limited in its application to the details of construction and to the arrangements of the components set forth in the aforementioned description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other systems and methods for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

The detailed descriptions aforementioned may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine and/or manual operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

What is claimed as new and desired to be secured by Letters Patent of the United States is:

1. A game system comprising:

a second game machine for executing a second game which is different from a basic game played in a slot machine;

a plurality of second game terminals, each of which comprises a bet input device with which a second game bet on a second game player is to be inputted by another player; and a bet controller for issuing a bet signal in accordance with said second game bet when said second game bet is inputted;

a slot machine comprising a game controller programmed so as to execute said basic game and also programmed so as to enable said second game executed on said second game machine to be played when a prescribed second game start condition is established as a result of said basic game; and a command input device to which a command is to be inputted, said command concerning acceptance or refusal of said second game bet on said second game player from a player other than said second game player, said game controller issuing a command signal in accordance with said command when said command is inputted; and a central controller for determining a payout value to each of said second game terminals based upon said bet signal, said command signal and a result of said second game.

2. A game system comprising:

a second game machine for executing a second game which is different from a basic game played in a slot machine;

a plurality of second game terminals, each of which comprises a bet input device with which a second game bet on a second game player is to be inputted by another player; and a bet controller for issuing a bet signal in accordance with said second game bet when said second game bet is inputted;

a slot machine comprising a game controller programmed so as to execute said basic game and also programmed so as to enable said second game executed on said second game machine to be played when a prescribed second game start condition is established as a result of said basic game; and a command input device to which a command is to be inputted, said command concerning acceptance or refusal of said second game bet on said second game player from a player other than said second game player, said game controller issuing a command signal in accordance with said command when said command is inputted; and a central controller for determining a payout value to each of said second game terminals based upon said bet signal, said command signal and a result of said second game wherein the payout value to each of said second game terminals determined by said central controller is determined based upon said bet signal received within a prescribed waiting period before start of said second game and a result of said second game when said command signal is not received within said waiting period, and based upon a bet signal received within a period from the time point of start of said waiting period to the time point of receipt of said command signal and a result of said second game when said command signal is received within said waiting period.

3. A game system comprising:

a second game machine for executing a second game which is different from a basic game played in a slot machine;

a plurality of second game terminals, each of which comprises a bet input device with which a second game bet on a second game player is to be inputted by another player; and a bet controller for issuing a bet signal in accordance with said second game bet when said second game bet is inputted;

a slot machine comprising:

a game controller programmed so as to execute said basic game and also programmed so as to enable said second game executed on said second game machine to be played when a prescribed second game start condition is established as a result of said basic game; and a command input device to which a command is to be inputted, said command concerning acceptance or refusal of said second game bet on said second game player from a player other than said second game player, said game controller issuing a command signal in accordance with said command when said command is inputted; and a central controller for determining a payout value to each of said second game terminals based upon said bet signal, said command signal and a result of said second game, wherein the payout value to each of said second game terminals determined by said central controller is determined based upon said bet signal received within a prescribed waiting period before start of said second game and a result of said second game when said command signal is not received within said waiting period, and based upon a bet signal received within a period from the time point of start of said waiting period to the time point of receipt of said command signal and a result of said second game when said command signal is received within said waiting period, and wherein said slot machine has a display, and said game controller displays a status of the second game bet made by the player other than said second game player to said display based upon said bet signal.

4. A game system comprising:

a second game machine for executing a second game which is different from a basic game played in a slot machine;

a plurality of second game terminals, each of which comprises a bet input device with which a second game bet on a second game player is to be inputted; and a bet controller for issuing a bet signal in accordance with said second game bet when said second game bet is inputted;

a slot machine comprising a game controller programmed so as to execute said basic game and also programmed so as to enable said second game executed on said second game machine to be played when a prescribed second game start condition is established in said basic game; and a central controller for determining a payout value to each of said second game terminals, said payout value determined based upon said bet signal received within a prescribed waiting period before start of said second game and a result of said second game when said command signal is not received within said waiting period, and based upon a bet signal received within a period from the time point of start of said waiting period to the time point of receipt of said command signal and a result of said second game when said command signal is received within said waiting period.

5. The game system according to claim 4, wherein said slot machine has a display, and said game controller displays a status of the second game bet made by the player other than said second game player to on said display based upon said bet signal.

6. A game system comprising:

a second game machine for executing a second game which is different from a basic game played in a slot machine;

a plurality of second game terminals, each of which comprises a bet input device with which a second game bet on a second game player is to be inputted; and a bet controller for issuing a bet signal in accordance with said second game bet when said second game bet is inputted;

a slot machine comprising a game controller programmed so as to execute said basic game and also programmed so as to enable said second game executed on said second game machine to be played when a prescribed second game start condition is established in said basic game; a command input device to which a command is to be inputted, said command concerning acceptance or refusal of said second game bet made by a player other than said second game player on said second game player; and a display, said game controller issuing a command signal in accordance with said command when said command is inputted, and displaying a status of the second game bet made by the player other than said second game player to said display based upon said bet signal; and a central controller for determining a payout value to each of said second game terminals, said payout value determined based upon said bet signal received within a prescribed waiting period before start of said second game and a result of said second game when said command signal is not received within said waiting period, and based upon a bet signal received within a period from the time point of start of said waiting period to the time point of receipt of said command signal and a result of said second game when said command signal is received within said waiting period.

7. The game system according to claim 1, wherein said game controller allows the command to be inputted by said command input device every time the bet signal is issued from each of said second game terminals, said command input device is configured such that a command for accepting or refusing the second game bet based upon said bet signal can be inputted into said command input device, and said central controller determines the payout value to each of said second game terminals based upon the bet signal allowed by said command signal and a result of said second game.

8. A game system comprising:

a second game machine for executing a second game which is different from a basic game played in a slot machine;

a plurality of second game terminals, each of which comprises a bet input device with which a second game bet on a second game player is to be inputted; and a bet controller for issuing a bet signal in accordance with said second game bet when said second game bet is inputted;

a slot machine comprising a game controller programmed so as to execute said basic game and also programmed so as to enable said second game executed on said second game machine to be played when a prescribed second game start condition is established in said basic game; and a command input device to which a command is to be inputted, said command concerning acceptance or refusal of said second game bet on said second game player from a player other than said second game player, said game controller issuing a command signal in accordance with said command when said command is inputted, and allowing the command to be input by said command input device every time the bet signal is issued from each of said second game terminals, and said command input device being configured such that a command for accepting or refusing the second game bet based upon said bet signal can be inputted into said command input device; and a central controller for determining a payout value to each of said second game terminals, said payout value determined based upon the bet signal allowed by said command signal and a result of said second game.

9. A game control method comprising:

a basic game step of executing a basic game played in a slot machine;

a second game step of allowing a second game different from said basic game to be played when a prescribed second game start condition is established as a result of said basic game; and a payout value determination step of determining a payout value, said payout value determined based upon a second game bet inputted by a player other than a second game player on said second game player, a command inputted by said second game player concerning acceptance or refusal of said second game bet, and a result of said second game.

10. A game control method comprising:

a basic game step of executing a basic game played in a slot machine;

a second game step of allowing a second game different from said basic game to be played when a prescribed second game start condition is established as a result of said basic game;

a payout value determination step of determining a payout value, said payout value determined based upon a second game bet inputted by a player other than a second game player on said second game player, a command inputted by said second game player concerning acceptance or refusal of said second game bet, and a result of said second game;

a step of allowing the second game bet to be inputted by the player other than said second game player on said second game player; and a step of allowing a command for closing the second game bet from the player other than said second game player on said second game player to be inputted as said command, said payout value determination step being a step of determining a payout value to said second game bet based upon the second game bet inputted within a prescribed waiting period before start of said second game and a result of said second game when said command is not inputted within said waiting period, and based upon the second game bet inputted within a period from the time point of start of said waiting period to the time point of input of said command and a result of said second game when said command is inputted within said waiting period.

11. A game control method comprising:

a basic game step of executing a basic game played in a slot machine;

a second game step of allowing a second game different from said basic game to be played when a prescribed second game start condition is established as a result of said basic game;

a payout value determination step of determining a payout value, said payout value determined based upon a second game bet inputted by a player other than a second game player on said second game player, a command inputted by said second game player concerning acceptance or refusal of said second game bet and a result of said second game;

a step of allowing the second game bet to be inputted by the player other than said second game player on said second game player;

a step of allowing a command for closing the second game bet from the player other than said second game player on said second game player to be inputted as said command, said payout value determination step being a step of determining a payout value to said second game bet based upon the second game bet inputted within a prescribed waiting period before start of said second game and a result of said second game when said command is not inputted within said waiting period, and based upon the second game bet inputted within a period from the time point of start of said waiting period to the time point of input of said command and a result of said second game when said command is inputted within said waiting period; and a step of displaying a status of the second game bet inputted by the player other than said second game player on said second game player.

12. A game control method comprising:

a basic game step of executing a basic game played in a slot machine;

a second game step of allowing a second game different from said basic game to be played when a prescribed second game start condition is established in said basic game;

a step of allowing a second game bet made by a player other than a second game player on said second game player to be inputted;

a step of allowing a command for closing the second game bet from the player other than said second game player on said second game player to be inputted, said command inputted by said second game player; and a payout value determination step of determining a payout value to said second game bet, said payout value determined based upon the second game bet inputted within a prescribed waiting period before start of said second game and a result of said second game when said command is not inputted within said waiting period, and based upon the second game bet inputted within a period from the time point of start of said waiting period to the time point of input of said command and a result of said second game when said command is inputted within said waiting period.

13. The game control method according to claim 12, further comprising a step of displaying a status of the second game bet inputted by the player other than said second game player on said second game player.

14. A game control method comprising:

a basic game step of executing a basic game played in a slot machine;

a second game step of allowing a second game different from said basic game to be played when a prescribed second game start condition is established in said basic game; and a step of allowing a second game bet made by a player other than a second game player on said second game player to be inputted;

a step of displaying a status of the second game bet inputted by the player other than said second game player on said second game player;

a step of allowing a command for closing the second game bet from the player other than said second game player on said second game player to be inputted, said command inputted by said second game player; and a payout value determination step of determining a payout value to said second game bet, said payout value determined based upon the second game bet inputted within a prescribed waiting period before start of said second game and a result of said second game when said command is not inputted within said waiting period, and based upon the second game bet inputted within a period from the time point of start of said waiting period to the time point of input of said command and a result of said second game when said command is inputted within said waiting period.

15. A game control method comprising:

a basic game step of executing a basic game played in a slot machine;

a second game step of allowing a second game different from said basic game to be played when a prescribed second game start condition is established as a result of said basic game;

a payout value determination step of determining a payout value, said payout value determined based upon a second game bet inputted by a player other than a second game player on said second game player, a command inputted by said second game player concerning acceptance or refusal of said second game bet, and a result of said second game;

a step of allowing the second game bet made by the player other than said second game player on said second game player of said second game to be inputted;

a step of allowing a command for accepting or refusing the second game bet inputted by said player other than said second game player every time said second game bet is inputted, to be inputted as said command; and a payout value determination step being a step of determining a payout value to said second game bet based upon the second game bet allowed by said command, and a result of said second game.

16. A game control method comprising:

a basic game step of executing a basic game played in a slot machine;

a second game step of allowing a second game different from said basic game to be played when a prescribed second game start condition is established in said basic game;

a step of allowing a second game bet made by a player other than a second game player on said second game player to be inputted;

a step of enabling input of a command for accepting or refusing the second game bet made by the player other than said second game player on said second game player of said second game every time said second game bet is inputted by said player other than said second game player; and a payout value determination step of determining a payout value to said second game bet, said payout value determined based upon the second game bet allowed by said command, and a result of said second game.

* * * * *